(12) United States Patent
Sotos

(10) Patent No.: US 11,037,470 B1
(45) Date of Patent: Jun. 15, 2021

(54) SYSTEM AND METHOD FOR COMMUNICATION OF FOOD ATTRIBUTES

(71) Applicant: John George Sotos, Palo Alto, CA (US)

(72) Inventor: John George Sotos, Palo Alto, CA (US)

( * ) Notice: Subject to any disclaimer, the term of this patent is extended or adjusted under 35 U.S.C. 154(b) by 3 days.

(21) Appl. No.: 13/573,488

(22) Filed: Sep. 17, 2012

(51) Int. Cl.
*G09F 3/00* (2006.01)

(52) U.S. Cl.
CPC ...................................... *G09F 3/00* (2013.01)

(58) Field of Classification Search
CPC .......... B42D 15/00; G09C 3/00; G06Q 10/00; G06Q 50/00; G06Q 30/00; G06Q 99/00; G09F 3/00
USPC ............ 283/55, 67, 70, 74, 60.1; 705/1.1, 3, 705/14.4, 317, 325
See application file for complete search history.

(56) References Cited

U.S. PATENT DOCUMENTS

| | | | | |
|---|---|---|---|---|
| 7,725,326 | B1 * | 5/2010 | Tracy et al. ................... | 705/1.1 |
| 2003/0163354 | A1 * | 8/2003 | Shamoun .............. | G06F 19/324 705/3 |
| 2005/0086080 | A1 * | 4/2005 | Stump et al. ..................... | 705/2 |
| 2008/0162188 | A1 * | 7/2008 | Kripalani et al. ................. | 705/3 |

OTHER PUBLICATIONS

Vieira et al., "Multivariable Statistical Visualization and McDonalds Nutritional Information: Chose Your Meal", 2006, ICOTS-7.*
Astel et al., "Classification of Drinking Water Samples Using the Chernoff's Faces Visualization Approach", 2006, Polish J. of Environ. Stud., vol. 15, No. 5, pp. 691-697.*
21-CFR-101.9. [Food and Drug Administration, US Dept. of Health and Human Services.] US Code of Federal Regulations. 2008. pp. 19-46.
Anonymous. "Nutrition: know the facts." Cleveland Clinic Journal of Medicine. 2005; 72(7): 619.
Brownell KD, Koplan JP. "Front-of-package nutrition labeilng—an abuse of trust by the food industry?" New England J Med. 2011; 364: 2373-2375.
Bueno Mas, et al. "Meta3D++—Visualizaçao de Informaçoes em Realidade Aumentada." WRA 2005, Piracicaba, Anais. Piracicaba: UNIMEP, 2005 pp. 33-36.

(Continued)

*Primary Examiner* — Justin V Lewis

(57) ABSTRACT

The invention includes a system and method for communicating information about attributes of a food. Common attributes of a food include its nutritional content (e.g. its protein content, salt content, vitamin B12 content, etc.), but there are many others. Communication of information to a human may occur when the human sees a facial glyph, the facial glyph representing information about the food's attributes. The specification teaches embodiments of the invention that map food attribute information (and possibly other information) into attributes of the face shown in the facial glyph, e.g. the appearance of the nose in the facial glyph may communicate salt content of a food via a longer nose for higher salt content, and a smaller nose for lower salt content. Embodiments of the invention vary the mapping of food attributes to facial attributes to improve information communication. Accessory visual elements may enhance the information communicated.

22 Claims, 16 Drawing Sheets

(56) References Cited

OTHER PUBLICATIONS

Figure 1A:
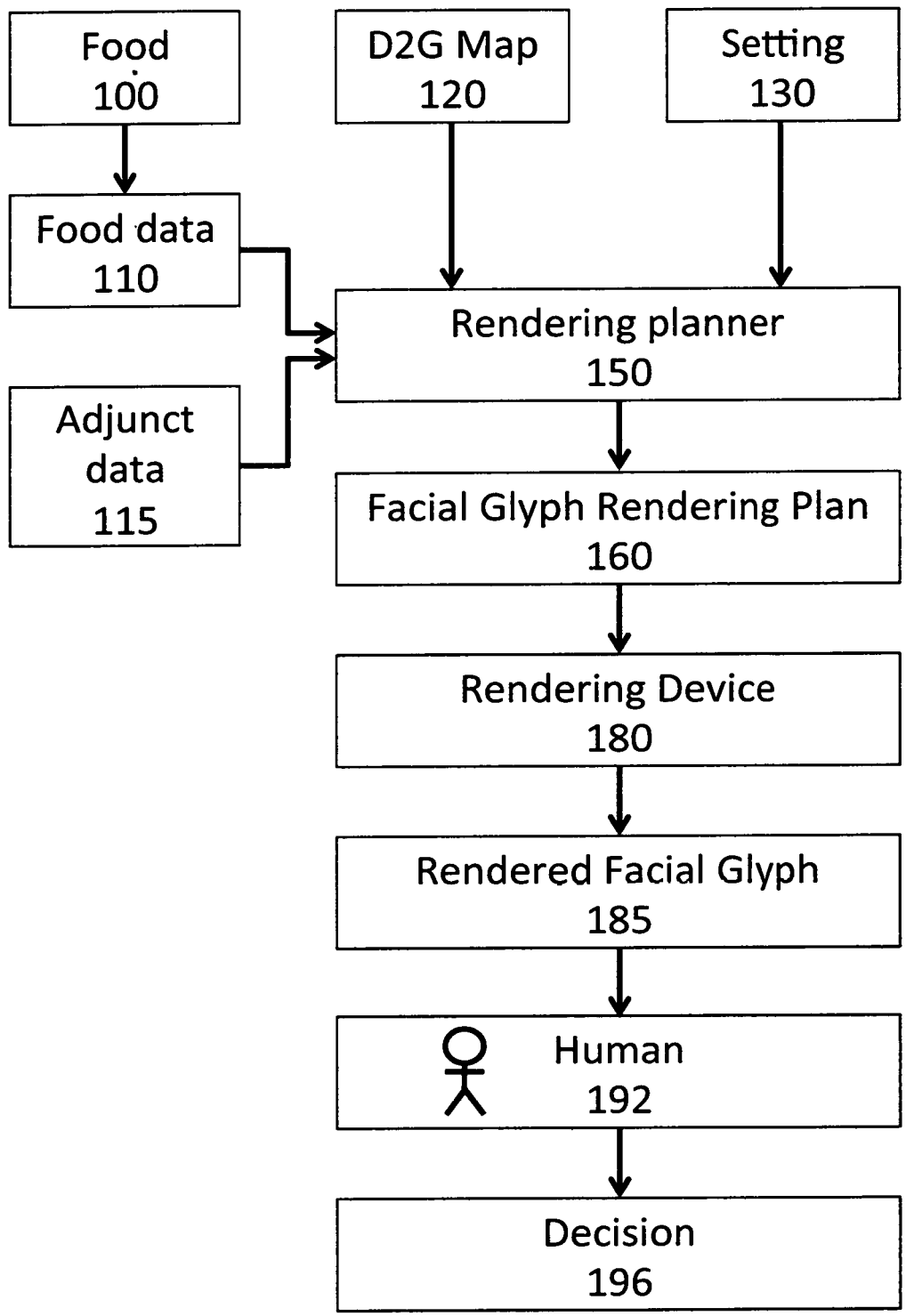

Chernoff H. "Using faces to represent points in k-dimensional space graphically." Journal of the American Statistical Association. 1973; 68, 361-368.
FDA (US Food and Drug Administration). http://www.fda.gov/Food/LabelingNutrition/ucm202726.htm—accessed Jul. 10, 2011.
Flury B, Riedwyl H. "Graphical representation of multivariate data by means of asymmetrical faces." Journal of the American Statistical Association, 1981; 76: 757-765.
Hunt N. "Chernoff faces in Microsoft Excel." Teaching Statistics. 2004; 26 (3):75-77.
Kaswell AS. "Chernoff and the Face Value of Numbers." Annals of Improbable Research. Jul.-Aug. 2010; 16(4): 6-9.
Komohi M, Kawamura S, Ishihara S. "Averageness of symmetry: which is more important for facial attractiveness?" Acta Psychologica. 2009; 131: 136-142.
Layton L. "FDA cracking down on food-packaging claims, from coconut pies to olive oil." Washington Post. Mar. 4, 2010.
Layton L. "Firms bring nutrition labels to fore." Washington Post. Jan. 25, 2011.
Meiguins BS, et al. "Multidimensional Information Visualization Using Augmented Reality." VRCIA '06 Proceedings of the 2006 ACM international conference on Virtual reality continuum and its applications. New York: Association for Computing Machinery, 2006.
Mozaffarian D, et al. "Trans Fatty Acids and Cardiovascular Disease." New England Journal of Medicine. 2006; 354: 1601-1613.
Narayan A. "Building a better label." Time.com, May 2, 2010.
Narayan A, "Figuring out food labels." Time.com, May 2, 2010.
Nestle M, Ludwig DS. "Front-of-package food labels: public health or propaganda?" JAMA. 2010; 303; 771-772.
Okie S. "Reviving the FDA." New England Journal of Medicine. 2010; 363: 1492-1494.
Tufte ER. The Visual Display of Quantitative Information. Cheshire, CT: Graphics Press, 1983. p. 97.
Wainer H, Thissen D. "Graphical data analysis." Annual Review of Psychology. 1981; 32: 191-241.

\* cited by examiner

Figure 3A

Prior Art

Nutrition Facts

Serving Size 1 cup (228g)
Servings Per Container 2

Amount Per Serving

| Calories 260 | Calories from Fat 120 |
|---|---:|
| | % Daily Value* |
| Total Fat 13g | 20% |
| Saturated Fat 5g | 25% |
| Trans Fat 2g | |
| Cholesterol 30mg | 10% |
| Sodium 660mg | 28% |
| Total Carbohydrate 31g | 10% |
| Dietary Fiber 0g | 0% |
| Sugars 5g | |
| Protein 5g | |

| Vitamin A 4% | • | Vitamin C 2% |
|---|---|---|
| Calcium 15% | • | Iron 4% |

*Percent Daily Values are based on a 2,000 calorie diet. Your Daily Values may be higher or lower depending on your calorie needs:

| | Calories: | 2,000 | 2,500 |
|---|---|---|---|
| Total Fat | Less than | 65g | 80g |
| Sat Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Calories per gram:
Fat 9 • Carbohydrate 4 • Protein 4

Figure 3B

399

Nutrition Facts

Serving Size 1 cup (228g)
Servings Per Container 2

Amount Per Serving

| Calories 260 | Calories from Fat 120 |
|---|---:|
| | % Daily Value* |
| Total Fat 13g | 20% |
| Saturated Fat 5g | 25% |
| Trans Fat 2g | |
| Cholesterol 30mg | 10% |
| Sodium 660mg | 28% |
| Total Carbohydrate 31g | 10% |
| Dietary Fiber 0g | 0% |
| Sugars 5g | |
| Protein 5g | |

| Vitamin A 4% | • | Vitamin C 2% |
|---|---|---|
| Calcium 15% | • | Iron 4% |

*Percent Daily Values are based on a 2,000 calorie diet. Your Daily Values may be higher or lower depending on your calorie needs:

| | Calories: | 2,000 | 2,500 |
|---|---|---|---|
| Total Fat | Less than | 65g | 80g |
| Sat Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Calories per gram:
Fat 9 • Carbohydrate 4 • Protein 4

398

5700

5710

5720

5730

5740

5750

5770   5771

SYSTEM AND METHOD FOR COMMUNICATION OF FOOD ATTRIBUTES

CROSS-REFERENCES TO RELATED APPLICATIONS

This application claims priority to U.S. Provisional Patent No. 61/535,102, titled "System and Method for Communication of Food Attributes," filed on 15 Sep. 2011, hereby incorporated by reference for all purposes.

BACKGROUND OF THE INVENTION

A nutritional label attempts to communicate information about the nutritional content of a food to a human. Often appearing on the surface of packages that contain a food product, billions of such labels are produced every year. Narayan has observed that a nutritional label "is printed on virtually every processed food product in the Western world" (Narayan A. "Building a better label." *Time.com*, 2010 May 2; downloaded 23 Jul. 2011.

His observation may or may not be correct.) Many types of nutritional labels exist. In the United States, the US Food and Drug Administration (FDA) has many rules governing the appearance and content of a nutrition label it calls the "Nutrition Facts Label" (NFL).

Additional nutritional information—i.e. beyond that required by a government—is sometimes available on or near food packaging. Merely by way of example, a food manufacturer may print text on a package saying "Low in fat." As an additional example, a food manufacturer may put a glyph on a package that is intended to communicate nutrition-related information, e.g. the checkmark-and-valentine-shaped glyph developed by the American Heart Association. As yet an additional example, a grocery store may label a shelf "Low salt" and stock on that shelf only foods that are low in salt (or claimed to be low in salt).

Two types of labels that provide such additional nutritional information may be defined. Other types may exist. Some labels may be classified as both types.

(1) A "front of package" food label displays additional nutritional information on the front of food packaging. According to the Washington Post, the food industry has recently "rolled out . . . what it called a 'monumental and historic' effort to put nutrition facts on the front of packaging for processed foods" (Layton L. "Firms bring nutrition labels to fore." Washington *Post*. Jan. 25, 2011.).

Front of package food labels are controversial in some circles (Nestle M, Ludwig D S. "Front-of-package food labels: public health or propaganda?" *JAMA*. 2010; 303; 771-772.) (Brownell K D, Koplan J P. "Front-of-package nutrition labeling—an abuse of trust by the food industry?" *New England Journal of Medicine*. 2011; 364; 2373-2375.).

Even the First Lady of the United States has demonstrated an interest in the topic, saying that clear front labeling could help parents make healthier choices for families (Layton 2011).

(2) Some displays of additional nutrition information have been called "at-a-glance" labels, presumably because they are designed with the hope of communicating information to a consumer "at a glance," without the more deliberate examination sometimes associated with the alphanumeric "Nutrition Facts" label. Merely by way of example, Narayan reports "One promising program, called Traffic Light, which was developed in the U.K. by the national Food Standards Agency, uses a color-coded scheme to indicate at a glance the amount of fat, saturated fat, sugars and salt contained in a food (red for high, amber for medium and green for low)" (Narayan, "Building.").

At-a-glance labels can be controversial, too. Narayan also writes: "At-a-glance labels assume that the consumer is too ignorant to make an informed decision, says Harvard's [Dr. Daniel] Ludwig. The solution should be to offer more, not less, information. Ludwig says improved nutrition education would help consumers fully understand Nutrition Facts panels and choose better foods. 'It's good to be simple, but not too simple,' says Ludwig. 'Food choices are too complicated to be reduced to simply green, amber or red.'" (Narayan, "Building.")

In reviewing a plurality of food labeling schemes, Narayan has commented: "Some food labels are designed to inform consumers. Others are meant to confuse and seduce." (Narayan, "Figuring out food labels." *Time.com*, 2010 May 2.). Narayan's review includes labeling efforts by Kellogg's, the American Heart Association, Kraft, Pepsico, Con Agra, Unilever, Hannaford Brothers, "independent experts," the Dutch government, Britain's Food Standards Agency, and the FDA.

The FDA stated in 2009 that reliable nutrition labeling of food products was one of their top priorities (Layton, 2011.). In 2010, "in an unusually broad crackdown", the FDA issued Warning Letters to 17 manufacturers informing the firms that the labeling for 22 of their food products violated provisions of the Federal Food, Drug, and Cosmetic Act that require labels to be truthful and not misleading (http://www.fda.gov/Food/LabelingNutrition/ucm202726.htm—accessed Jul. 10, 2011.) (Layton L. "FDA cracking down on food-packaging claims, from coconut pies to olive oil." Washington *Post*. Mar. 4, 2010.). Okie reports on "an industry-backed food labeling campaign [that] resulted in green check marks (signifying 'better for you' products) on the front of sugar-laden breakfast cereals and high-sodium frozen meals[.] The FDA issued a letter to the program's managers . . . . Major food companies stopped participating, and the program was suspended." (Okie S. "Reviving the FDA." *New England Journal of Medicine*. 2010; 363: 1492-1494.).

The present invention aims to improve the communication of food-related information to humans.

LISTING OF THE DRAWINGS

FIG. 1A: Production of a facial glyph reflecting attributes of a food

Figure 1B:
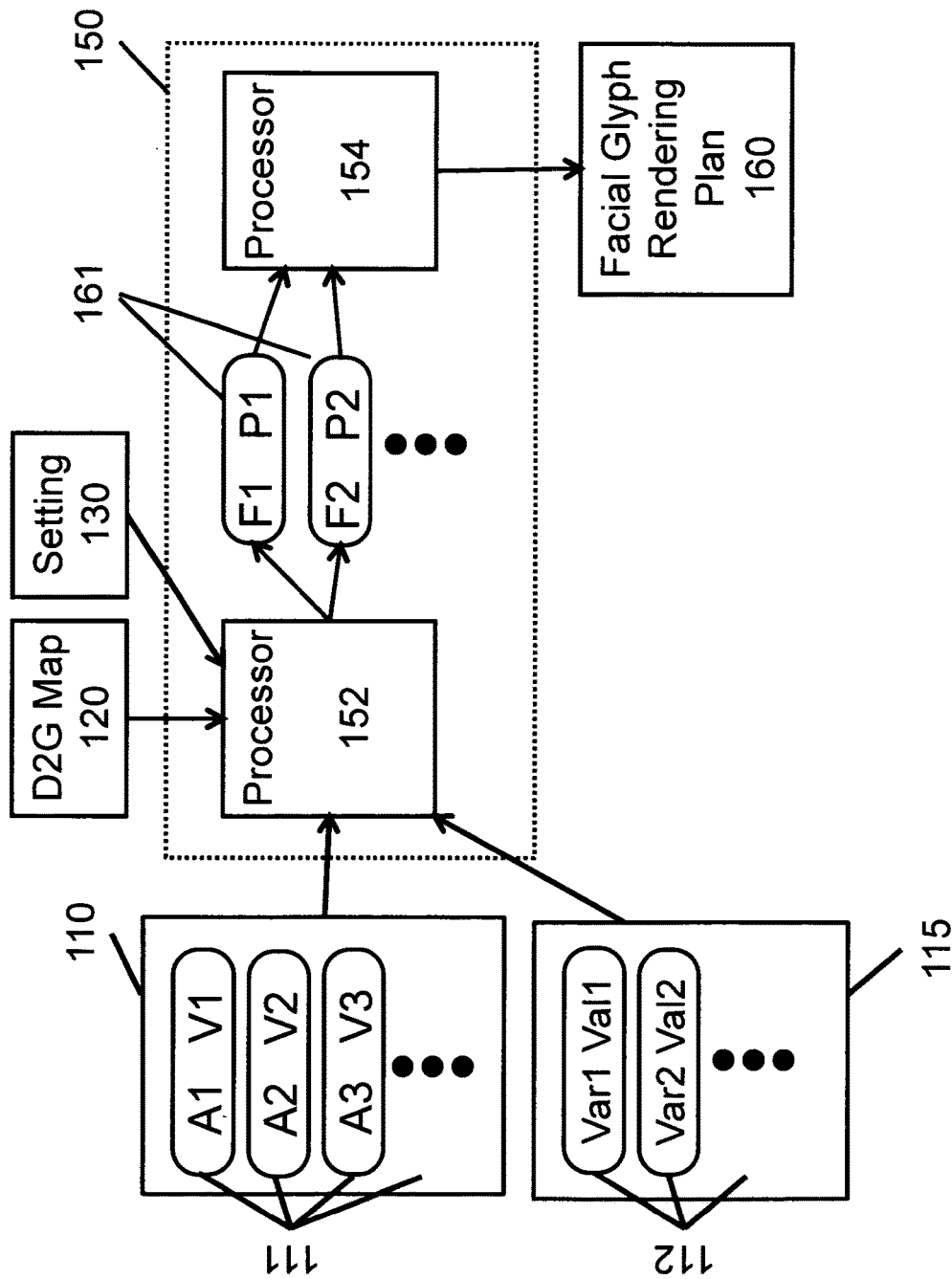

FIG. 1B: Additional detail of Rendering Planner in an embodiment of the invention.

Figure 1C:
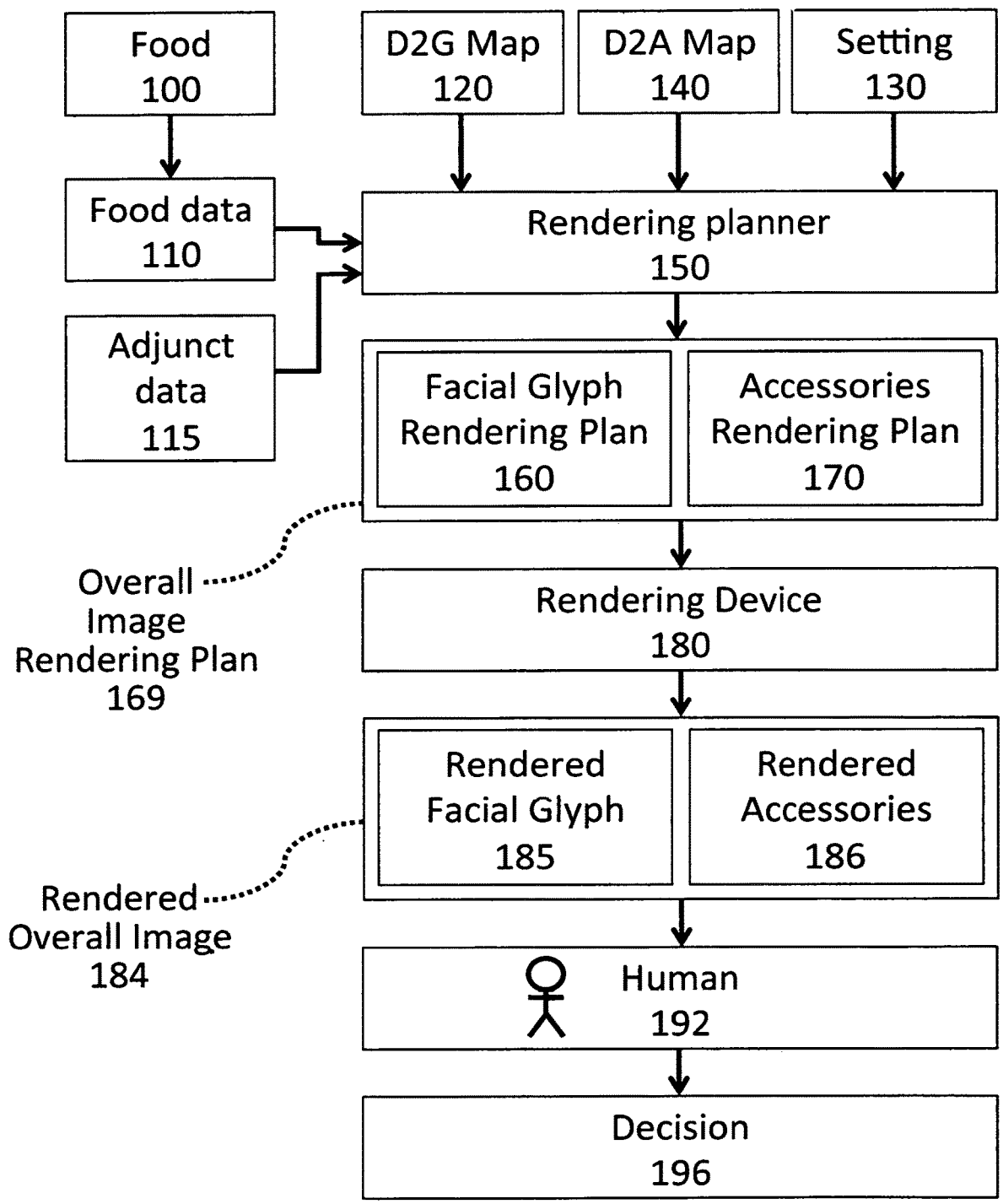

FIG. 1C: Production of an overall image (including facial glyph and accessory elements) reflecting attributes of a food FIG. 1D: Additional detail of Rendering planner in an embodiment of the invention.

Figure 1D:
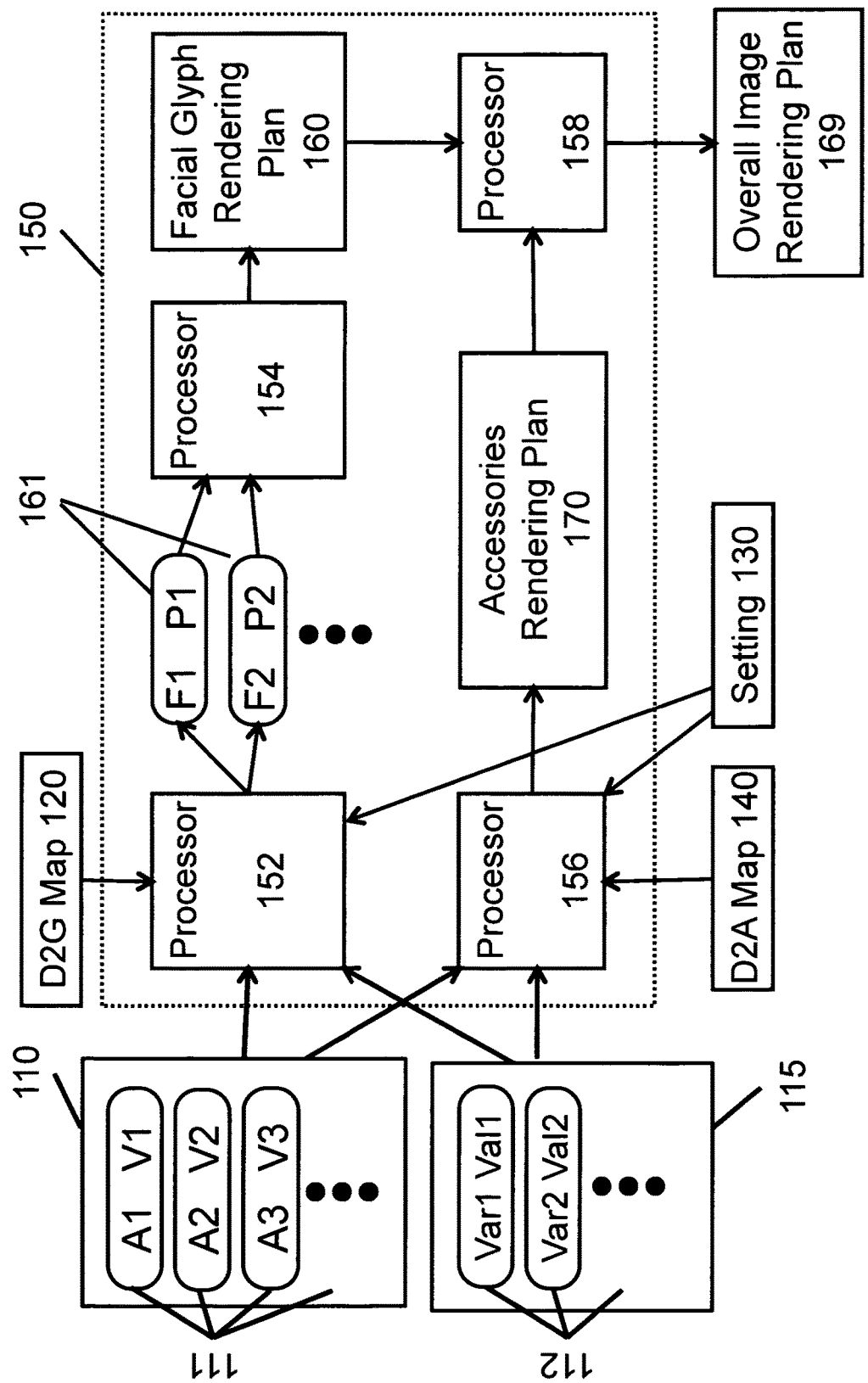
Figure 1E:
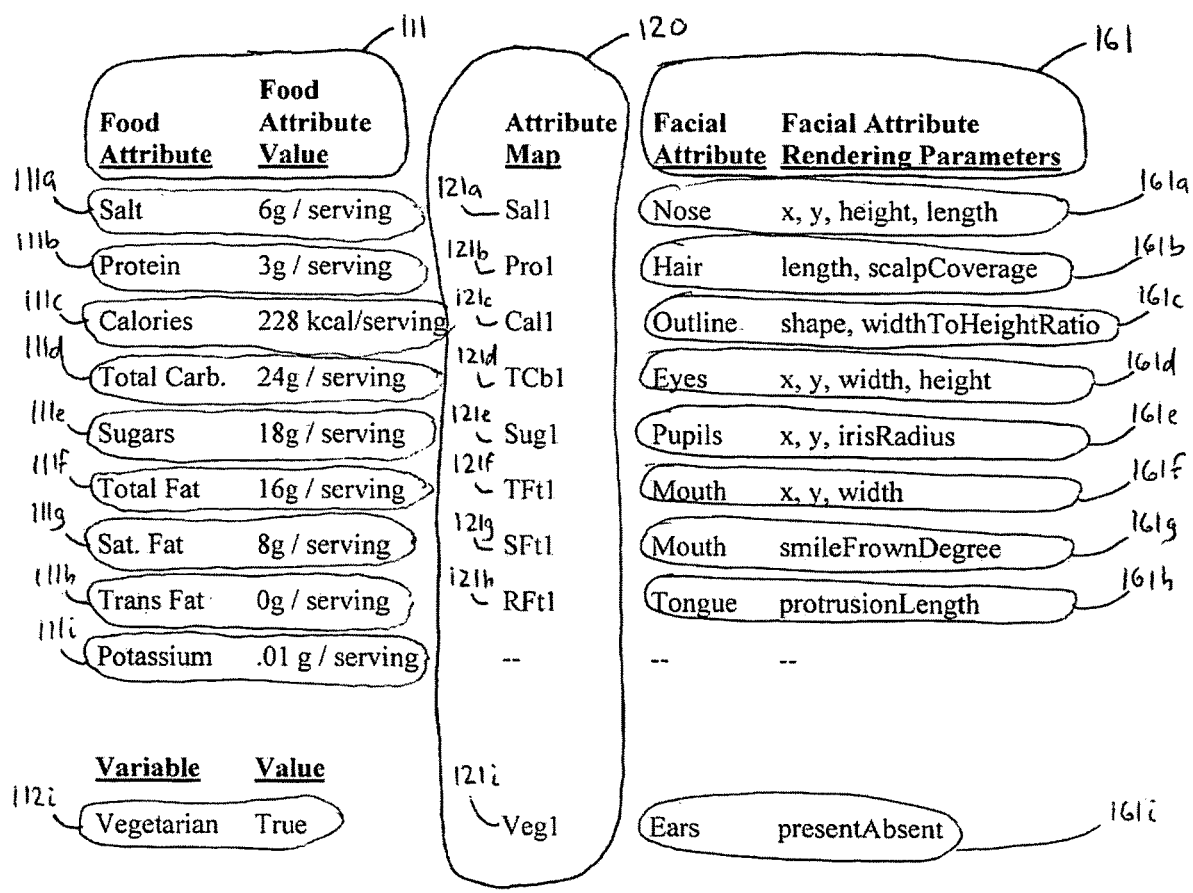

FIG. 1E: Additional detail of D2G map in an embodiment of the invention

Figure 1F:
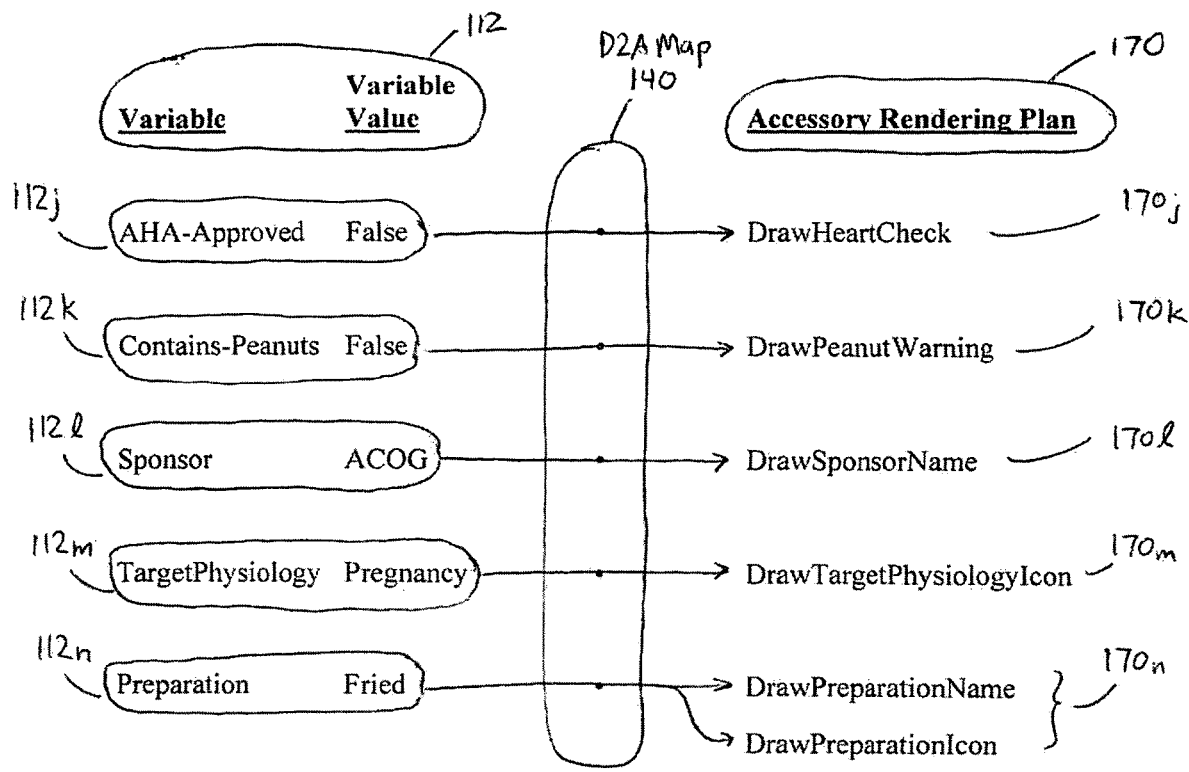

FIG. 1F: Additional detail of D2A map in an embodiment of the invention

Figure 2:
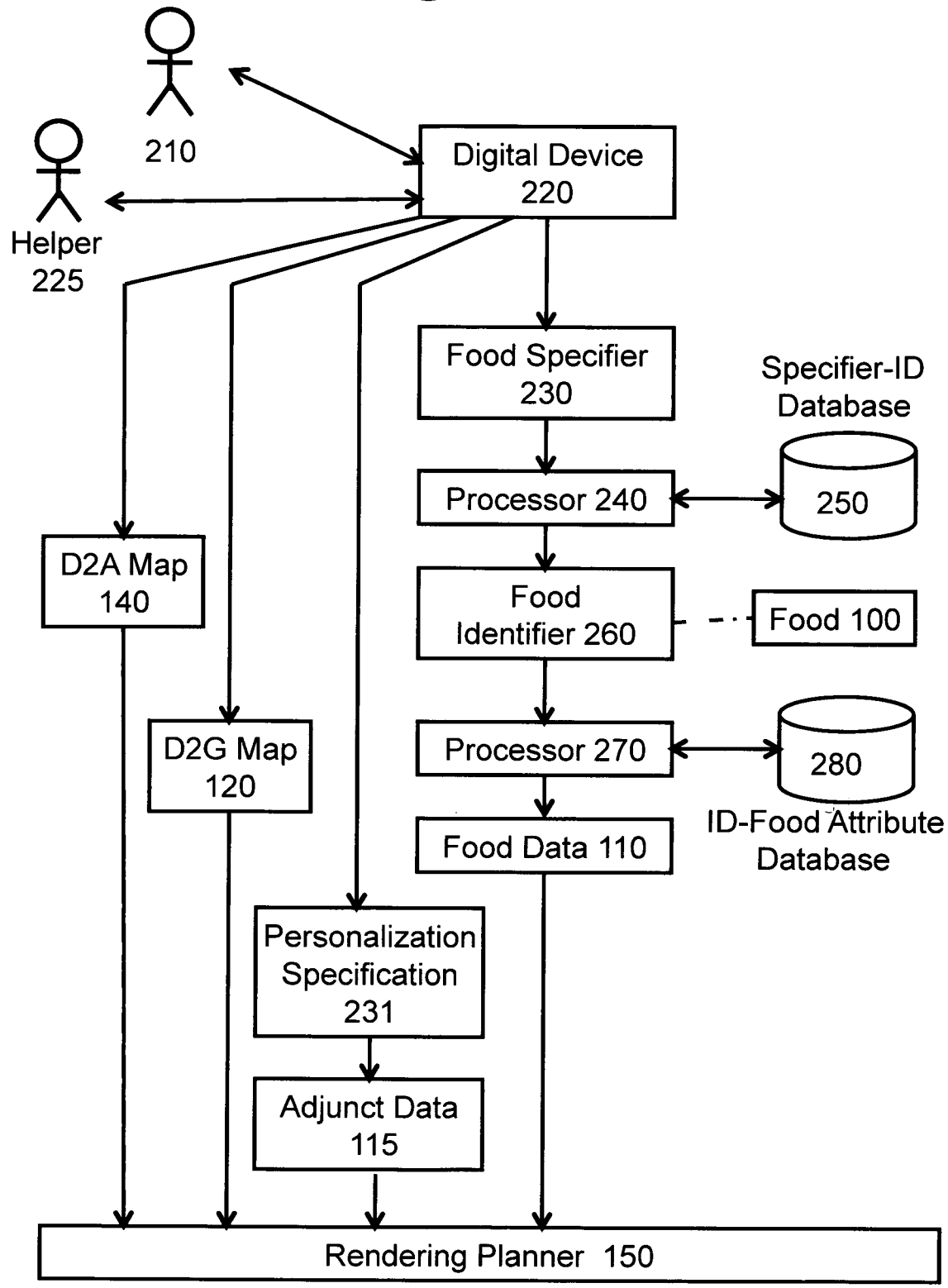

FIG. 2: Personalization of inputs to Rendering Planner

FIG. 3A: Nutrition Facts Label

FIG. 3B: Nutrition Facts Label containing a facial glyph

Figure 3C:
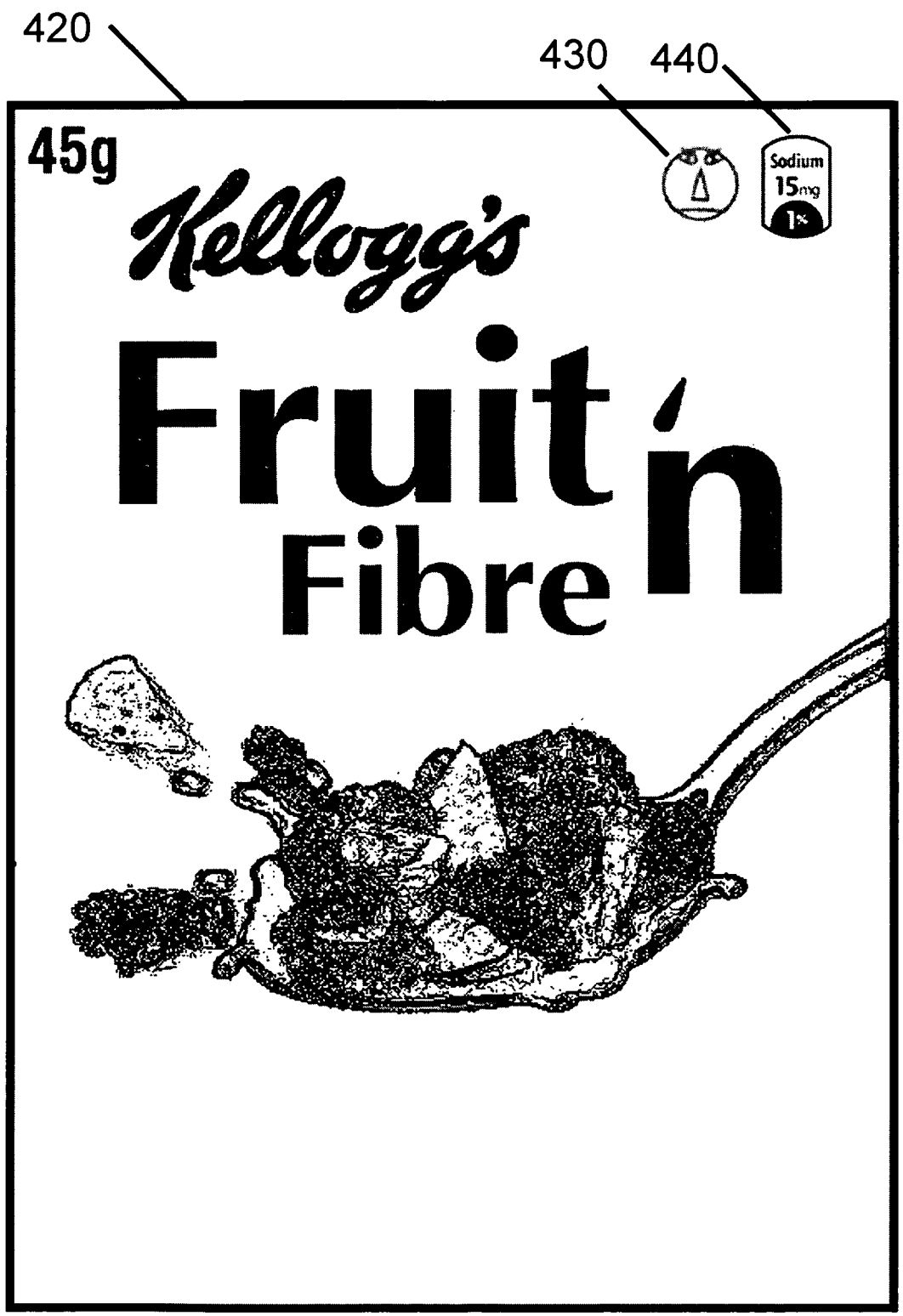

FIG. 3C: Primary display panel of a cereal box, with facial glyph

Figure 4:
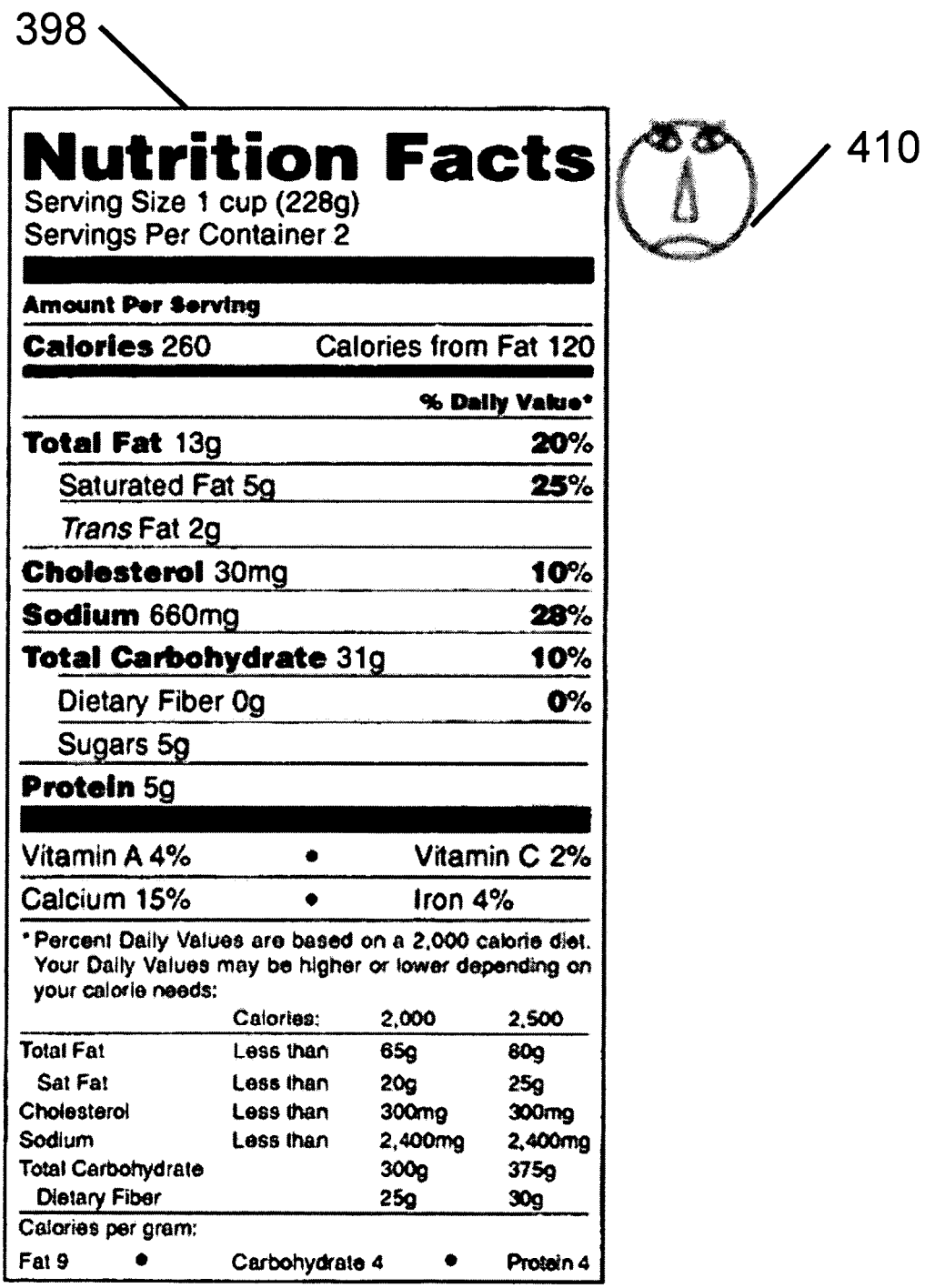

FIG. 4: Nutrition Facts Label with a facial glyph in proximity

Figure 5A:
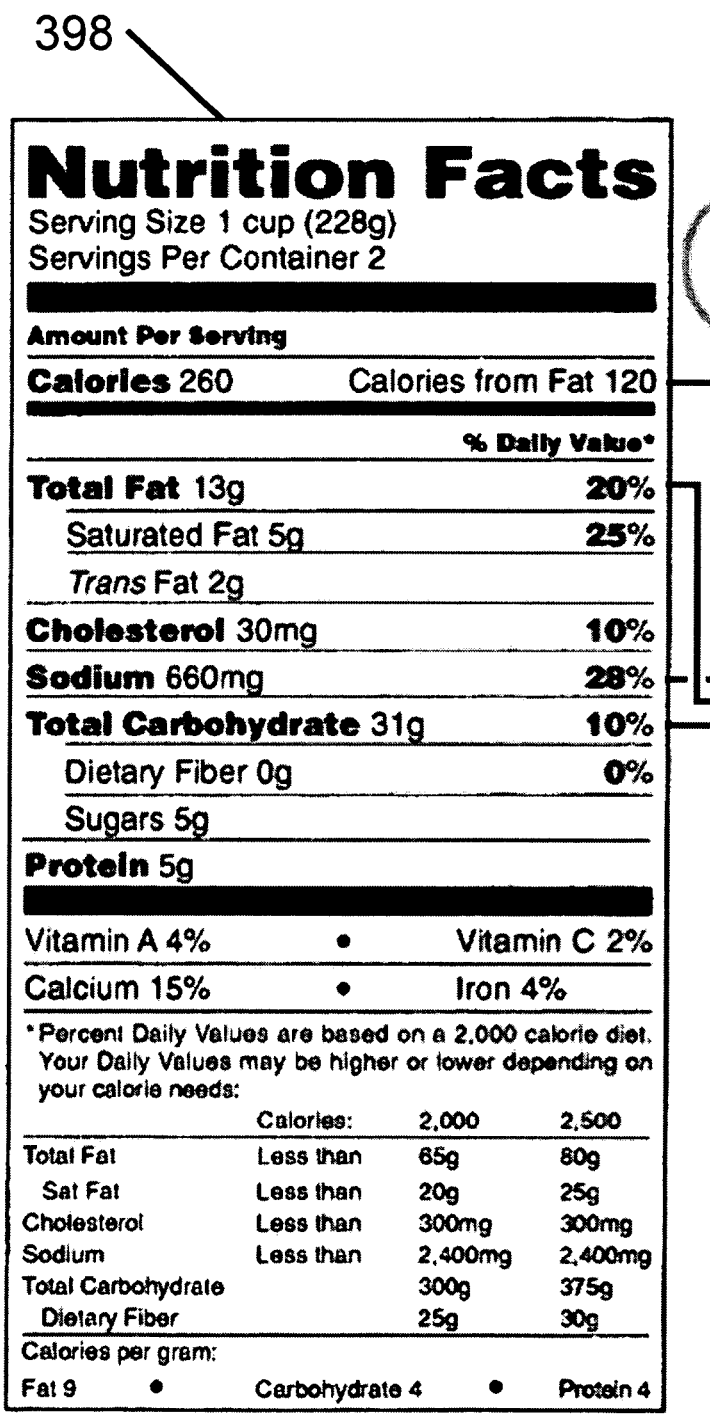
Figure 5A:
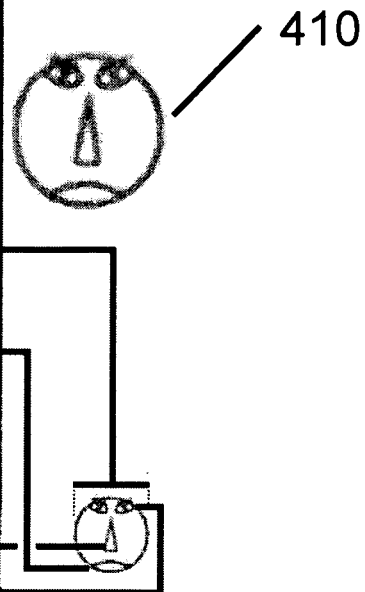

FIG. 5A: A facial glyph serving as a key to explain the meaning of facial attributes FIG. 5B: Detail of FIG. 5B FIG. 6: Facial attributes inserted into Nutrition Facts Label to explain their meaning FIG. 7: Nutrition Facts Label with multiple facial glyphs, arising from different schemes FIG. 8: Nutrition Facts Label with scheme reflecting method of food preparation FIG. 9: Exemplary facial glyphs FIG. 10A: User interacting with a digital device FIG. 10B: Touchscreen of a digital device, facial glyph, and accessories

DESCRIPTION OF THE INVENTION

Inventor has noticed several problems with the NFL, including, but not restricted to: (1) In some formats, the printing is small, making it hard for persons with poor eyesight to read, (2) It is generally absent from some settings where food-buying decisions are made, e.g. restaurant menus, (3) It is generally absent from some settings where food is advertised, e.g. television commercials, (4) It is generally absent from the packaging of some types of foods, e.g. unprocessed meat, fish, and poultry, and (5) For a person trying to eat a low-fat, low-salt, low-sugar diet, it is sometimes easy to forget to check all the pertinent entries on the NFL.

Merely by way of example for issue (5), above, inventor is generally very careful with food purchase and consumption decisions, but has been dismayed to discover more than once to have purchased a food whose NFL he failed to fully appreciate, e.g. purchasing Old Bay seasoning (higher in salt than desired), purchasing Quaker Oatmeal Squares cereal (higher in sugar than desired). In the case of Old Bay, inventor consumed it for an extended time, re-purchasing it many times, before realizing his error.

Inventor has noticed that nutritional labeling is not free of problems outside the United States, e.g. the printing of nutritional information so small on some European product packaging that reading it without spectacles to correct presbyopia is very difficult.

The nutritional content of foods is multivariate data, e.g. it includes information about the amount of protein, carbohydrate, fat, salt/sodium, and so forth. According to books by Edward Tufte, a plurality of techniques are available for representing multivariate data (see, for example: Tufte E R. *The Visual Display of Quantitative Information*. Cheshire, Conn.: Graphics Press, 1983.).

One such technique is Chernoff faces. Chernoff faces include a glyph that evokes a face; the size, shape, and/or other attributes of various facial features represents the value of a variable. In a 1973 article, Chernoff used faces to represent multivariate data about fossils and about geology (Chernoff H. "Using faces to represent points in k-dimensional space graphically." *Journal of the American Statistical Association*. 1973; 68, 361-368.). Many publications that teach about Chernoff faces use an example set of multivariate data. For example, Wainer and Thissen use data about each of the 50 states in the union (Wainer H, Thissen D. "Graphical data analysis." *Annual Review of Psychology*. 1981; 32: 191-241. See pages 222-223 and 227-231.). As a further example, Hunt teaches Chernoff faces as a representation for food nutritional data (Hunt N. "Chernoff Faces in Microsoft Excel." *Teaching Statistics*. 2004; 26(3): 75-77). As an additional example, Bueno et al use nutrition data plotted as three-dimensional Chernoff faces as part of a case study to demonstrate new functionalities in data analysis (Bueno M A S, Lima J P S M, Teichrieb V, Kelner J. "Meta3D++-visualização de informaeções em realidade aumentada." WRA 2005, Piracicaba, Anais. Piracicaba: UNIMEP, 2005, pages 33-36. Downloaded Jul. 24, 2011.) (Meiguins B S, Gonçalves A S, de Oliveira C S, do Carmo R M C, Pinheiro S C V, Hernandez L. "Multidimensional Information Visualization Using Augmented Reality." *VRCIA '06 Proceedings of the 2006 ACM international conference on Virtual reality continuum and its applications*. New York: Association for Computing Machinery, 2006. Downloaded Jul. 24, 2011.)

FIG. 1A teaches an embodiment of the invention. Rendering planner 150 uses food data 110, adjunct data 115, D2G-map 120, and setting information 130 to produce a facial-glyph-rendering-plan 160. Rendering device 180 uses facial-glyph-rendering-plan 160 to render facial glyph 185 on an output medium for setting 130. Facial glyph 185 is perceived by human 192, e.g. human 192 sees facial glyph 185. Human 192 may make a decision 1% about food 100 using information about food 100 that is transmitted by facial glyph 185.

Food data 110 contains information about food 100. Merely by way of example, food data 110 may include data about the quantity of nutrients in food 100. Further teaching about food data 110 appears in connection with FIG. 1B.

Adjunct data 115 includes data that are not food data 110. It may include setting information 130. (Setting information 130 is represented separately in Figures for clarity and ease of discussion.) Facial glyph 185 may contain information derived from adjunct data 115. Adjunct data 115 may include, but is not restricted to: setting information 130, physiological data about a human (e.g. human 192 is allergic to peanuts or has diabetes), preference data about a human (e.g. human 192 dislikes fish), personalization information (e.g. human 192 prefers facial glyph 185 to have a minimum height of 2 inches), context-free data (e.g. the caloric content of protein is 4 calories per gram).

D2G-map 120 helps transform food data 110 and adjunct data 115 into elements of facial-glyph-rendering-plan 160. "D2G" is used for brevity, as an abbreviation for "food-and-adjunct data to facial glyphs" or "data to glyphs." Merely by way of example, D2G-map 120 may transform information about the salt content of food 100 into the length of the nose in facial glyph 185. Further teaching about D2G-map 120 appears in connection with FIG. 1B and FIG. 1E.

Setting information 130 describes aspects of a setting in which facial glyph 185 appears. Examples of a setting include, but are not restricted to, food packaging, a printed restaurant menu (e.g. next to, or otherwise in proximity to, the alphanumeric—or other—listing of an entry on the menu), an overhead menu display in a McDonald's restaurant, an electronic display, a television screen, the display of a Motorola MC-17 unit, a poster, a book, a magazine, a newspaper, a coupon, a recipe card, a peel-and-stick label, a shelf tag (e.g. a label on a grocery shelf designed to give information about the items on the shelf), and a printed card near a food being served at a buffet or cafeteria line.

Setting information 130 may include, but is not restricted to: rendering device 180, display size, pixel density, available colors, etc. Rendering planner 150 may base facial-glyph-rendering-plan 160 on setting information 130. Merely by way of example, rendering planner 150 may specify a size for facial glyph 185, and it may be preferable for facial glyph 185 to be of a larger size when it appears on an overhead menu at a McDonald's restaurant than when it appears on a candy bar wrapper.

Merely by way of example, rendering planner 150 may be implemented as software codes for execution on a digital computer or other processor.

Merely by way of example, glyph rendering plan 160 may be implemented as software codes for execution on a digital computer or other processor. As a further example, glyph rendering plan 160 may be expressed in a manner specific to output device 180.

Rendering device 180 may be chosen based on setting information 130. Examples of rendering device 180 include, but are not restricted to, a printer (e.g. laser printer, inkjet printer, offset printer, dot-matrix printer, line printer), an electronic display (e.g. a computer monitor for a laptop computer or desktop computer or tablet computer, a display for a smartphone), a laser cutter (e.g. one of the models from Epilog Laser, Golden, Colo.), an X-Y plotter, a fabric cutter, a human with drawing tools, a computer-controlled sewing machine.

Facial glyph 185 has an appearance resembling that of a face, e.g. it reasonably evokes a face to a human observer. The face may be stylized or schematic, and may be anatomically impossible (e.g. a square facial outline or eyes that extend beyond the margin of the head). In an embodiment of the invention, facial glyph 185 communicates information about food data 110 and adjunct data 115, e.g. in the manner of a Chernoff face. In an embodiment of the invention, reducing or enlarging the size of facial glyph 185 does not alter the information it presents about food attributes (within the limits of rendering and visual perception).

Merely by way of example, human 192 may decide 196 to eat (or not eat) the food. As a further example, human 192 may decide 196 to purchase (or not purchase) the food. As yet another example, human 192 may decide 196 how strongly to recommend (or not recommend) the food to a client or friend or in an article that human 192 is writing for a health magazine. Human 192 may or may not consciously realize that he or she is facing a decision 196 about the food at that moment or in the future.

In an embodiment of the invention multiple copies of facial glyph 185 may be rendered. Merely by way of example, if a package of food 100 contains two servings of food 100 (however "serving" is defined), then two copies of facial glyph 185 may be rendered. As a further example, if a package of food contains 2.5 servings of food 100, then two-and-a-half copies of facial glyph 185 may be rendered. (A half-copy of facial glyph 185 could, merely by way of example, include only the left half of the full facial glyph 185.) An appendix to this specification provides explanations of some terminology used herein.

FIG. 1B teaches an embodiment of the invention in which rendering planner 150 uses D2G-map 120 to transform food data 110 and adjunct data 115 to facial glyph rendering plan 160 (these items carry over from FIG. 1A).

Food data 110 includes one or more food attribute records 111, each record 111 referencing an attribute of food 100 and a value for that attribute of food 100. In FIG. 1B each food attribute record 111 is assigned an integer index, i, and the record's food attribute is represented as A-sub-i and the value of that attribute is represented as V-sub-i. In an embodiment of the invention, each record 111 is different from the others.

Exemplary food attributes are shown in Table 1. Others are possible. Food attributes may be categorized in various ways. Exemplary food attribute categories are also shown in Table 1. Merely by way of example, a category called "basic nutrients" may include the following food attributes: quantity of protein in the food, quantity of total carbohydrates in the food, quantity of sugars in the food, quantity of total fat in the food, quantity of saturated fat in the food, quantity of cholesterol in the food, quantity of calories in the food. "Quantity" can be expressed in various units, normalized in different ways, e.g. per serving of the food, per gram of the food.

Adjunct data 115 includes one or more adjunct records 112, each record 112 referencing a variable and a value for that variable. In FIG. 1B each adjunct record is assigned an integer index, i, and that record's variable is represented as var-sub-i and the value of that variable is represented as val-sub-i. In an embodiment of the invention, each record 112 is different from the others.

Processor 152 uses food data 110, adjunct data 115, and D2G-map 120 to provide one or more facial attribute rendering plans 161. In an embodiment of the invention, each facial attribute rendering plan 161 is a plan for rendering one or more facial attributes. In FIG. 1B, each facial attribute rendering plan 161 is assigned an integer index, j, and the set of facial attributes covered by the plan is represented as F-sub-j. The P-sub-j representation reinforces that the facial attributes are related to a plan for the F-sub-j. In an embodiment of the invention, each plan 161 is different from the others. Exemplary facial attributes are shown in Table 2. Others are possible. Facial attributes may be categorized in various ways. Facial attributes are sometimes called "facial features" herein.

Facial attribute rendering plans 161 may be expressed in terms that are applicable to rendering device 180 (as in FIG. 1A). Merely by way of example, if rendering device 180 is a computer-controlled display screen (e.g. on an iPhone or Android phone) then facial attribute rendering plans 161 might be in the form of computer codes for execution on the computer, or in the form of a parameter key-value dictionary used by a set of computer codes. If object-oriented programming is used, facial attribute rendering plans 161 may be one or more software objects. Merely by way of example, facial attribute rendering plans 161 may be a declarative set of codes, e.g. following the SVG (scalable vector graphics) standard.

Processor 154 combines the one or more facial attribute rendering plans 161 into an overall facial glyph rendering plan 160. Facial glyph rendering plan 160 may be a simple union of all facial attribute rendering plans 161, or may be a more complicated arrangement (e.g. overlying elements may obscure underlying elements, certain elements may be eliminated, etc.). It may be expressed in a same or different manner (e.g. software objects) as the facial attribute rendering plans 161.

In an embodiment of the invention, processor 154 is not needed because the facial attribute rendering plans 161 serve as the facial glyph rendering plan 160.

FIG. 1C teaches an embodiment of the invention, in which rendering device 180 outputs more than facial glyph 185. (Items numbered in FIG. 1A carry over.) Rendering device 180 outputs image 184 that includes facial glyph 185 and additional accessory elements 186. Accessory elements 186 do not include elements of facial glyph 185 and may enhance the presentation of information about food 100 to human 192.

As compared to FIG. 1A, rendering planner 150 in FIG. 1C additionally uses D2A-map 140 to produce an accessory-rendering-plan 170. Facial-glyph-rendering-plan 160 and accessory-rendering-plan 170 provide an overall image rendering plan 169.

Rendering device 180 uses overall-image-rendering-plan 169 to render overall image 184 on an output medium for setting 130. Facial glyph 185 and accessory elements 186 are part of overall image 184. Overall image 184 is perceived by human 192. Human 192 may make a decision 196 about food 100 using information about food 100 that is transmitted by overall image 184.

D2A-map 140 helps transform food data 110 and adjunct data 115 into elements of accessory-rendering-plan 170. "D2A" is used for brevity, as an abbreviation for "food-and-adjunct data to accessories" or "data to accessories." Further teaching about D2A-map 140 appears in connection with FIG. 1D and FIG. 1F.

Accessory elements 186 may reflect information in food data 110 or in adjunct data 115. Exemplary accessory elements 186 are listed in Table 3; other examples exist.

In an embodiment of the invention, overall image 184 appears discontinuous, e.g. there may a visible element that is not part of image 184 that lies between components of image 184.

FIG. 1D teaches an embodiment of the invention in which rendering planner 150 uses D2G-map 120 and D2A-map 140 to map food data 110 and adjunct data 115 to an overall image rendering plan 169. Item numbers carry over from FIG. 1B.

As in FIG. 1B, processor 152 uses food data 110, adjunct data 115, and D2G-map 120 to provide one or more facial attribute rendering plans 161. As in FIG. 1B, processor 154 combines the one or more facial attribute rendering plans 161 into an overall facial glyph rendering plan 160.

Processor 156 uses food data 110, adjunct data 115, and D2A-map 140 to provide an accessories-rendering-plan 170.

Processor 158 combines facial glyph rendering plan 160 and accessories rendering plan 170 to provide overall image rendering plan 169.

In an embodiment of the invention processor 152 and processor 158 are the same, and produce overall image rendering plan 169 without processor 154 or processor 158.

FIG. 1E teaches a possible structure of D2G-map 120 under the invention, using an exemplary prototype D2G-map 120. Item numbers carry over from earlier figures.

A plurality of food attribute records 111a-111i and a single adjunct record 112i are shown. Each of these records, except for 111i, maps to a corresponding facial attribute rendering plan 161a-161i. As a specific example, salt content of food 100, as expressed in food attribute record 111a, is mapped 121a to facial attribute rendering plan 161a, which, when executed by rendering device 180, draws a nose of a certain height and width, at a certain x-y (horizontal-vertical) position on facial glyph 185. Thus, in this example, mapping 121a maps salt content to the appearance of a nose on facial glyph 185.

Continuing the example, attribute mapping 121a could map a salt content (in g per serving) to a nose length as follows:
- salt content <=1.0 g/serving maps to minimum nose length
- salt content >=9.0 g/serving maps to maximum nose length
- salt content otherwise maps to minimum length plus (maximum minus minimum nose length) times (salt content−1) divided by (9 minus 1)

The above example shows an attribute mapping that is linear over a portion of its domain; there is no requirement that an attribute mapping be linear over any part. Merely by way of example, a logarithmic or Boolean mapping would be possible.

Similar to attribute mapping 121a, attribute mappings 121b-121h transform food attribute records 111b-111h into rendering plans 161b-161h that render facial attributes when executed by rendering device 180. These facial attributes include hair (in 161b), facial outline (in 161c), eye outlines (in 161d), eye pupils (in 161e), mouth (in 161f and 161g), and tongue (in 161h).

In addition, adjunct record 112i is mapped 121i to facial attribute rendering plan 161i (the facial attribute being ears).

The collected attribute mappings 121a-121i are components of D2G-map 120. Thus, as in FIG. 1B, D2G-map 120 maps food data 110 and adjunct data 115 to facial attribute rendering plans 161, which may be combined into facial glyph rendering plan 160. For convenience, attribute mappings 121a-121i may be given names, e.g. sal1 in the case of 121a.

Not all food data 110 need be mapped to a facial attribute rendering plan. For example, in FIG. 1E, the potassium food data record 111i is not mapped to a facial attribute.

Thus, the facial glyph 185 that is ultimately rendered will not reflect the potassium content of food 100.

It is not required that each food attribute map to a unique facial attribute. For example, in FIG. 1E, both the total fat food attribute record 111f and the saturated fat food attribute record 111g map to a mouth facial attribute.

Food attribute records 111a-111i are expressed in units normalized to a serving of food 100. Other units are possible, e.g. units normalized to gram of food 100.

All facial attributes may not appear in all instances of rendered facial glyph 185. Merely by way of example, ears may be missing in a particular instance.

Those of ordinary skill in the art will understand that there are other possible implementations of D2G-map 120.

FIG. 1F teaches a possible structure of D2A-map 140 under the invention, using an exemplary prototype D2A-map 140. Item numbers carry over from earlier figures.

A plurality of adjunct records 112j-112n and no food attribute records 111 (there could be food attribute records, but none are used in this example) maps to a corresponding accessory rendering plan 170j-170n. As a specific example, the approval of the American Heart Association 112j maps (indicated by arrow and dot) to accessory rendering plan DrawHeartCheck 170j which, when executed by rendering device 180, draws the Heart-Check icon of the American Heart Association as an accessory in overall image 184. Thus, in this example, mapping 121a maps salt content to the appearance of a nose on facial glyph 185.

The collected mappings of 112j-112n to 170j-170n are components of D2A-map 140. Thus, as in FIG. 1D, D2A-map 140 maps food data 110 and adjunct data 115 to accessory rendering plan 170.

Figure 7:
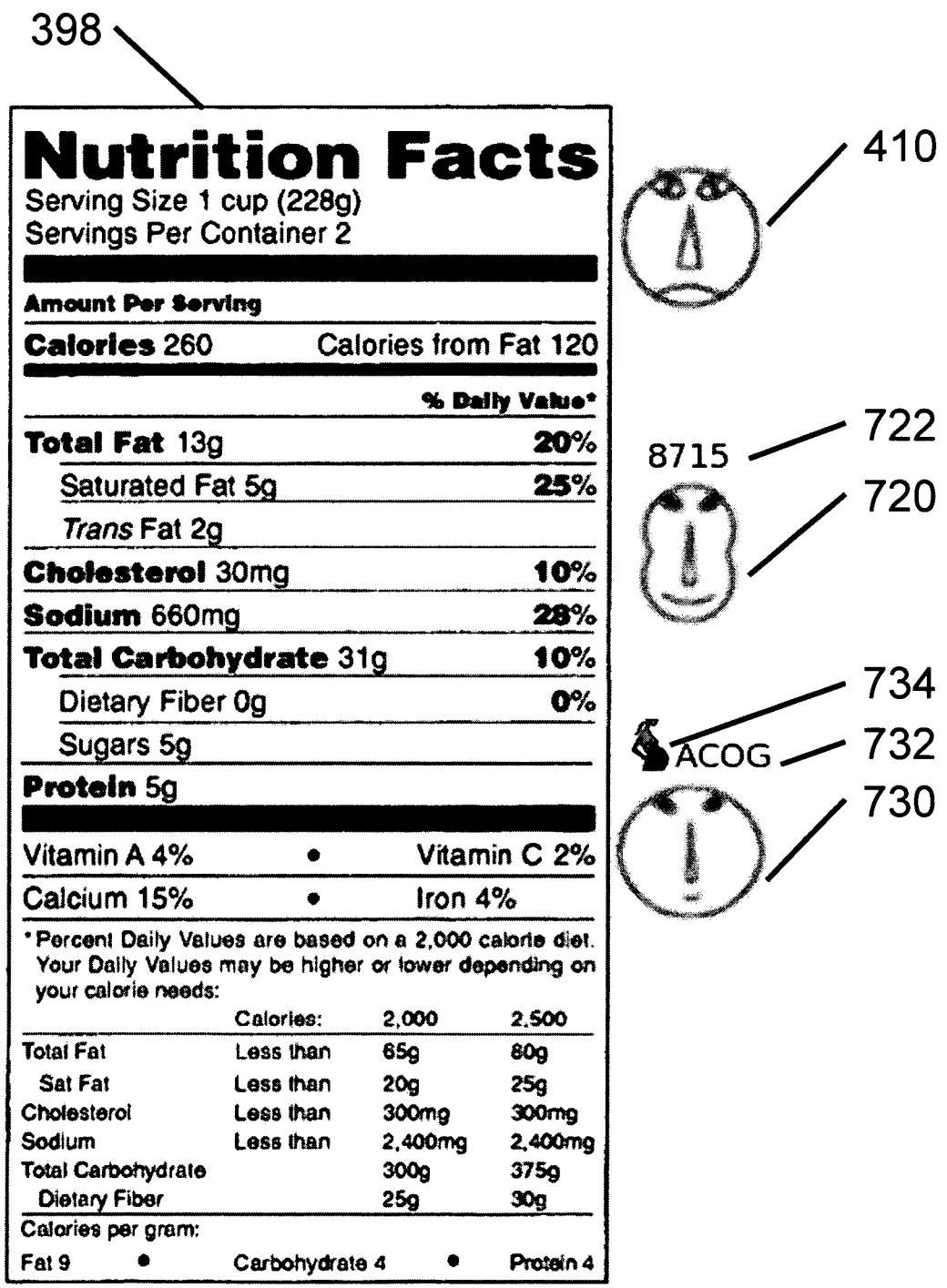

An example of accessory rendering plan 170m is icon 734 in FIG. 7. An example of accessory rendering plan 170l is text 732 in FIG. 7. An example of accessory rendering plan 170n is icon 840 and text 830 in FIG. 8.

FIG. 2 teaches an embodiment of the invention in which an input to rendering planner 150 (as in FIG. 1A) is personalized. Personalization may be directed at human 192, toward a group to which human 192 may be suspected of belonging, or to an unrelated group. Merely by way of example, human 192 may be suspected of belonging to the group diagnosed as having diabetes or to a group of imminent breakfast cereal purchasers.

Human 210 may or may not be the same as human 192 (as in FIG. 1A). Human 210 interacts with digital device 220 to communicate his or her desired personalizations. Examples of digital device 220 include, but are not restricted to, a personal computer, a smartphone (e.g. an iPhone or Android phone), a tablet computer (e.g. an iPad), a digital camera, a Motorola MC-17 unit, a product scanner at a grocery store checkout station, spectacles-cum-computer (e.g. Google Glass), and so on.

Digital device 220 translates the personalizations desired by human 210 into food specifier 230, personalization specifier 231, D2G-map 120, or D2A-map 140.

In an embodiment of the invention, the interaction of human 210 with digital device 220 produces a task that digital device 220 outsources to a helper human 225 in order to produce a personalization named above (230, 231, 120, 140). Examples of such tasks include, but are not restricted to, speech recognition on a digitized audio version of a food's spoken name, performing image recognition on a photograph of a plate of food. An example of helper human 225 includes a participant in the Amazon Mechanical Turk program; other classes of helper human 225 are possible.

Merely by way of example, if human 210 wishes to generate facial glyph 185 or overall image 184 for a particular food (as in FIG. 1C), he or she interacts with digital device 220 to produce food specifier 230. Examples of interaction include, but are not restricted to, typing or speaking the name of a food; indicating a food by using a pointing device, such as a computer mouse or, on a touchscreen computing device, a finger or, using spectacles-cum-computer, a head gesture; acquiring an image of a food or a food package; typing, speaking, scanning (e.g. by laser or other means), or photographing information from a food package's bar code; moving an RFID-tagged food package within range of an RFID-reader.

In an embodiment of the invention, food specifier 230 will serve as food identifier 260. In an alternative embodiment of the invention, food specifier 230 is translated to food identifier 260 by processor 240 that has access to database 250 of food specifiers and food identities. It is generally desirable for food specifier 230 and food identifier 260 to refer to the same food.

Merely by way of example, human 210 might speak the phrase "strawberry Pop-Tarts with speckly thingies in the frosting" to digital device 220 (e.g. an iPhone) that, in turn, produces the alphanumeric string "strawberry Pop-Tarts with speckled things in the frosting "as food specifier 230. To continue this example, processor 240 (e.g. a processor in the iPhone) then looks up in database 250 (e.g. a remote networked database, accessed via a wireless query from the iPhone) the alphanumeric food specifier string and finds no corresponding entry; processor 240 then applies heuristics to the alphanumeric food specifier, yielding three specifier strings: "strawberry," "Pop-Tarts," and "frosting." Continuing, processor 240 then performs searches in database 250 on all three of these new specifier strings, finding that there is one entry common to each of the three searches; processor 240 then retrieves food identifier 260 from the common database entry that it found.

In an embodiment of the invention (not shown in Figure), processor 240 interacts with human 210 as part of its efforts to determine food identifier 260. Merely by way of example, in the previous example, processor 240 may inform human 210 that it is going to use only the strings "strawberry," "Pop-Tarts," and "frosting" to seek food identifier 260. As another example, processor 240 may ask human 210 to approve its search strategy and/or its result, or to clarify use of the word "thingies," etc.

Processor 270 may use food identifier 260 to query a database 280. Database would return food data 110 (as in FIG. 1A) corresponding to food identifier 260. (Food identifier 260 may be considered the same as food 100 in FIG. 1A.) It may be advantageous to index food data database 280 by food identifier 260.

Rendering planner 150 (as in FIGS. 1A to 1D) may use food data 110 as input.

On some occasions, processor 240 may retrieve a plurality of food identifiers 260 from database 250 for a given food specifier 230. A plurality of queries to food data database 280 with the plurality of food identifiers 260 would generally yield a plurality of food data 110 records. In such a case, the plurality of food data 110 records may be combined (not shown) to produce "composite food data" which could be used in the invention as a single food data 110 record, e.g. supplied as input to rendering planner 150. Merely by way of example, food specifier 230 may be "McDonald's Extra Value Meal #4," and processor 240 may retrieve three food identifiers 260 corresponding, respectively, to a Big Mac, a large order of French fries, and a large Diet Coke. Continuing the example, processor 270 could retrieve from database 280 a food data 110 record for each of the three food identifiers. Different elements of food data 110 may be combined in different ways to produce composite food data. Merely by example, nutrient quantities (in common units) may be arithmetically summed, while the true/false presence of peanut products would often best be combined with a Boolean OR operator.

FIG. 2A also teaches that human 210 may interact with digital device 220 and possibly helper human 225 to produce personalization specification 231. Personalization specification 231 may be incorporated into adjunct data 115 (as in FIG. 1A) as input to rendering planner 150.

A plurality of possible D2G-maps 120 and D2A-maps 140 may often exist. Such a plurality may be kept in a database (not shown). Personalization may result in selection of a map from this database to use as input to rendering planner 150. Merely by way of example, human 210 may communicate to digital device 220 that that he/she is a diabetic, and digital device 210 accomplishes or initiates a task that retrieves a D2G-map 120 or D2A-map 140 from the database that has been specially crafted for diabetics.

In an embodiment of the invention, human 210 constructs a D2G-map 120 or a D2A-map 140, perhaps with assistance from software codes.

In an embodiment of the invention personalization may be performed by a set of software codes, with or without participation of human 210.

Uses

It has been said that, "The world has gone on to employ Chernoff faces a little, but not yet a lot" (Kaswell A S. "Chernoff and the Face Value of Numbers." *Annals of Improbable Research*. July-August 2010; 16(4): 6-9.).

The present invention makes improvements to the art, to improve the utility of Chernoff faces as a communication device.

An embodiment of the invention presents attributes of a food (e.g. nutritional information) via one glyph. That is, in this embodiment, the human viewer is not, as in the articles by Hunt and Bueno et al, looking at a plurality of glyphs, but is looking at a single glyph in an effort to understand the attributes of the food.

FIG. 3A shows an example nutritional label 398, in this case, a Nutrition Facts Label (21 CFR 101.9).

FIG. 3B shows an embodiment of the invention. An instance 399 of glyph 185 appears as part of nutritional label 398. In comparing FIG. 3A and FIG. 3B, it is apparent that instance 399 of glyph 185 does not disrupt the rest of the Nutrition Facts Label, an advantage of the present invention. Glyph 185 may appear in other positions in nutrition label.

FIG. 3A and FIG. 3B show a Nutrition Facts Label that is substantially compliant with FDA regulations. Glyph 185 may appear with other types of nutritional labels, e.g. a nutritional label developed by the food industry. FIG. 3C shows a primary display panel 420 for a box of cereal. An instance 430 of glyph 185 appears on the same panel as, and in proximity to, nutritional label 440. According to graphics in Narayan ("Figuring out food labels"), nutritional label 440 is part of Kellogg's "Nutrition at a Glance" program.

FIG. 4 shows an embodiment of the invention. An instance 410 of glyph 185 appears adjacent to a nutritional label 398. In comparing FIG. 4 and FIG. 3B, it is apparent that glyph 185 may sometimes be drawn at a larger size when not inside the borders of nutritional label 398, without disrupting the rest of nutritional label 398.

It may be suspected that standard Chernoff faces in many cases are unlikely to communicate information with the accuracy and precision required by FDA regulations pertaining to the Nutrition Facts label. For example, when looking at a facial feature in a single one of the Chernoff faces drawn by Hunt, it is typically difficult to know the quantitative value indicated by the feature's representation. As a specific example, if eye-size is used to represent protein content, what is the numerical protein content associated with the eyes as drawn for the "baked beans" glyph in Hunt's FIG. 4? There is no clear way to know if the grams-per-serving value is 1, 2, 3, 4, etc.

In FIG. 3B and in FIG. 4 positioning glyph 185 as part of, or in proximity to, nutritional label 398 allows a consumer to access the detail and precision of a nutritional label and the information from facial glyph 185 in a convenient way. A variety of proximities is possible, e.g. 0.5 mm, 1 mm, 2 mm, 0.5 cm, 1 cm, 2 cm, 0.5 inches, 1 inch, 2 inches, 1 face-diameter (as derived from glyph 185 for food 100 or for a standard food), 0.5 face-diameters, 2 face-diameters, 5 face-diameters. Proximity may be defined in other ways depending on the matter that is between facial glyph 185 and nutritional label (e.g. if the interposing matter is explaining facial glyph 185, then facial glyph may still be considered proximate even though it is separated from nutrition label 298 by more than some other criterion).

Figure 5B:
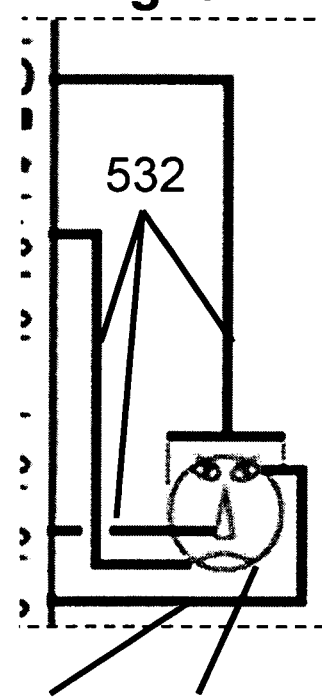

FIG. 5A shows an embodiment of the invention. FIG. 5B enlarges a portion of FIG. 5A. A human wishing to understand the representations made by instance 410 of glyph 185 can use the smaller version 520 of instance 410 as a key. The human can follow a line from a facial feature in face 520 to the nutrient that the facial feature represents. For example, in FIG. 5A and FIG. 5B, line 531 leads from the eyes in face 520 to the row representing total carbohydrate in nutritional label 398. This is indicative of the eyes representing total carbohydrate amount. Other lines 532 lead to other rows in nutritional label 398.

Figure 6:
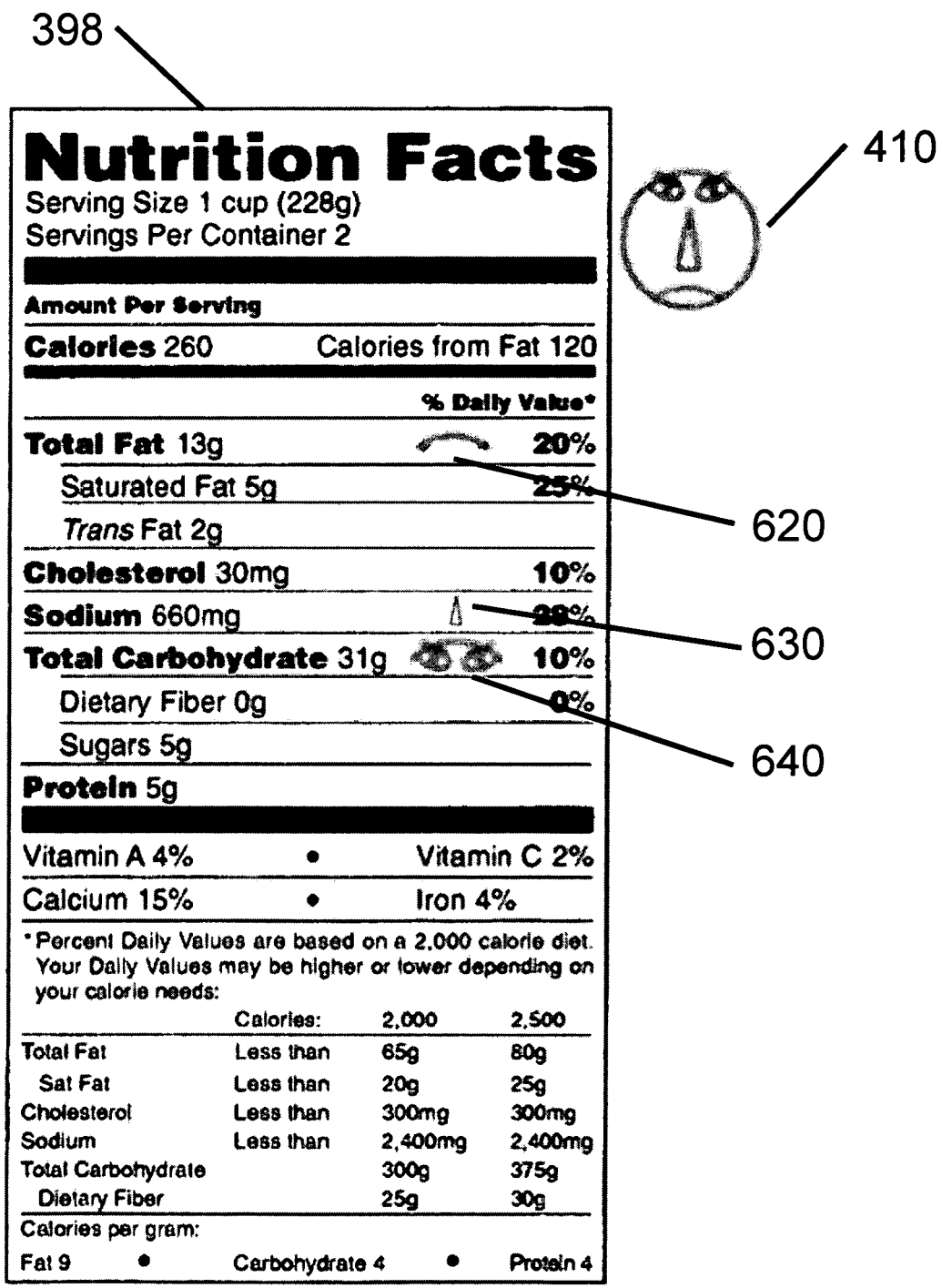

FIG. 6 shows an alternate embodiment of the invention, in which facial features of instance 410 of glyph 185 have been duplicated on rows for nutrients in nutritional label 398. For example, eyes 640 from instance 410 have been duplicated in the row for total carbohydrate. This is indicative of the eyes representing total carbohydrate amount. As a further example, nose 630 has been duplicated (at a somewhat reduced size) in the line representing sodium in nutritional label 398, indicating that the nose represents sodium content. The frowning mouth 620 from instance 410 has similarly been duplicated in the row for total fat in nutritional label 398.

Other methods of providing a key for interpreting glyph 185 exist. Merely by way of example, a specific "key face" may serve as the standard key printed in association with all nutritional labels. Such a face may have relevant facial features labeled with their corresponding nutrient(s). As a further example, this key face could be based on a set of food attributes that can be recommended to the public, so that consumers are frequently reminded of a worthy goal.

In FIG. 5A and FIG. 6, the nearby presence of a nutritional label helps build a key for understanding instance 410 of glyph 185. But even if no key is provided, as in FIG. 3B and FIG. 4, the nearby presence of a nutritional label can help consumers understand ("calibrate") the appearance of facial features in glyph 185. A consumer may look at the shape of the eyes in glyph 185 and then immediately look a little distance away to find the amount of total carbohydrate in the food, and thereby be "tutored" that a certain eye-shape is linked to a certain total carbohydrate amount.

Other positions of glyph 185 are possible relative to nutritional label 398. Merely by way of example, glyph 185 may be on the same panel of a food package on which nutritional label 398 appears. In many cases, the closer that glyph 185 appears to nutritional label 398, the easier a consumer will find it to look back and forth between glyph 185 and nutritional label 398. A separation between glyph 185 and nutritional label 398 may be best when it is less than the size of glyph 185.

In an embodiment of the invention, glyph 185 is placed in temporal and/or spatial proximity to a claim on a food package or to an advertisement or to a nutrition label. Merely by way of example, glyph 185 may be placed on the principal display panel of a cereal box, next to a claim, printed on the same panel, that the cereal is "good for you." As an additional example, glyph 185 may be displayed in a corner of a television screen when an advertisement for a food product plays on the screen.

Persons within a group may elect different personalizations and schemes on which to base their individual glyphs 185. In an embodiment of the invention, a plurality of glyphs 185 are displayed for a food, such that each member of a group has a glyph 185 that follows the member's personalization(s) and scheme(s). Merely by way of example, a home television system may be configured with information about personalizations and schemes for each member of a family. Continuing the example, when a commercial for a food product plays, attribute values for the food product are used to generate the glyphs for each member of the family, and the glyphs appear in a corner of the television image. Other groups are possible.

In an embodiment of the invention, attribute values of food 100 are communicated by a plurality of instances of glyph 185. Merely by way of example, one instance of glyph 185 may have facial features reflecting the amounts of various vitamins in food 100; another instance of glyph 185 may have facial features reflecting the amounts of various minerals in food 100; and still another instance of glyph 185 may have facial features reflecting the amounts of major nutrients (e.g. fats, carbohydrates, protein, sodium, cholesterol) in food 100. To continue the example, glyphs representing vitamin and mineral content could be positioned at or near the bottom of the Nutrition Facts Label, in the vicinity of the label currently reporting vitamin and mineral content. As a second example, one instance of glyph 185 could communicate information about the plurality of types of fat found in foods, e.g. total, saturated, polyunsaturated, monounsaturated, trans, and various types of omega.

Foods may have a large number of nutritional and other attributes. It is an advantage of the invention that a plurality of instances of glyph 185 can be used to communicate food attributes.

Harmony

In an embodiment of the invention, a baseline set of food attribute records 111 is identified. (Certain sets of nutritional data may qualify as a baseline set, for example.) D2G-map 120 and/or D2A-map 140 are based on this baseline set. They are adapted to produce a glyph 185 containing a "baseline" face when presented with the baseline set, such that the baseline face is perceived as "harmonious" to human 192. The baseline set may be viewed as a goal set or an ideal set or a reference set, etc.

"Harmonious" is inside quotation marks because many other concepts could be substituted: "beautiful," "pleasing," "attractive," "engaging," "winsome," "simpatico," "peaceful," etc. In general, positive concepts are preferred, but there is no requirement for positivity.

D2G-map 120 and/or D2A-map 140 may be further adapted so that a deviation of an attribute value of food 100 from the corresponding attribute value in the baseline set produces a deviation from harmony in one or more facial features of glyph 185.

Merely by way of example, consider (a) a baseline set of attributes and values that includes "salt content is zero" and (b) a D2G-map 120 of salt content to the size of the nose. In this example, when a food has zero salt, mapping 120 would produce a rendering plan for nose-size that, when rendered into a nose in glyph 185, would appear to human 192 as a pleasing nose substantially matching the nose in the baseline face. By contrast, when a food has a high amount of salt, mapping 120 would produce a rendering plan for nose-size that, when rendered into a nose in glyph 185, would appear to human 192 as a displeasing nose different from the nose in the baseline face.

A potential advantage of this embodiment is that human 192 may readily appreciate deviations from the baseline face, because many humans carry in their head an instinctive sense of a harmonious face that does not have to be taught. For example, a very very long nose is often considered to be an inharmonious facial feature. (Conceptions of facial harmony may be idiosyncratic or vary across cultures.) Thus, a facial glyph 185 so constructed may provide improved "at-a-glance" communication of nutritional information.

In an embodiment of the invention, the concept of harmony is replaced or augmented by the concept of emotional expression. A human viewing the face in glyph 185 may get an impression that the face is representing a particular emotion or state of mind, e.g. sadness, fear, anger, disapproval, pain, etc. (These, and others, may be called negative states of mind; their opposites may be called positive states of mind.) In an embodiment of the invention, a baseline set of values for food attributes is identified. D2G mapping 120 is based on this baseline set; it is adapted to produce a glyph 185 that gives to human 192 an impression of a negative state of mind when an attribute value of food 100 deviates from a baseline attribute value in an undesirable direction. In an embodiment of the invention, the intensity of the emotion that human 192 believes is portrayed on facial glyph 185 is positively correlated with the intensity of food 100's deviation of attributes from the baseline attribute values.

Mappings

It is apparent that D2G-map 120 can sometimes be an important element of the invention. For example, Wainer and Thissen (page 227) suggest the choice of assigning variables to facial features is non-trivial, saying: " . . . we must assign each variable to a facial feature. This is not always easy, nor is it unimportant." Under the invention, such assignments are implemented as part of D2G-map 120. Some design factors related to these assignments will be discussed. Other factors exist.

Mappings: Anatomy and Physiology

In examining published articles containing examples of Chernoff faces (e.g. Hunt, Chernoff, Wainer and Thissen), Inventor has encountered a problem: a difficulty remembering which variable in the data set is linked to a particular facial feature. For example, in FIG. 24 of Wainer and Thissen's article, a state's homicide rate is represented by the width of the nose, with a wider nose indicating a lower homicide rate (page 228). This is one of a plurality of linkages between a variable and a facial feature in this figure—too many for Inventor to remember easily when looking at the figure.

Inventor has discovered that recollection of the correspondence between a food attribute and facial attribute(s) can be improved by incorporating putative physiological and/or anatomical commonalities of the food attribute and the facial attribute(s) into D2G-map 120, to provide a mnemonic anatomic/physiologic correspondence.

Merely by way of example, hair is composed largely of protein. Thus, using the appearance of hair in glyph 185 to represent protein content of food 100 may be perceived by some people as a "natural" or "sensible" assignment, and may, therefore, be more easily remembered than alternate mappings. Moreover, if increased protein content in food 100 is represented by an increased amount of hair in glyph 185, the linkage between protein and hair may be further strengthened mnemonically in some cases. Table 2 contains additional examples; other examples are possible.

The above is in contrast to a teaching of Hunt. His facial glyph for coffee gives (to Inventor) an impression of somnolence, which is opposite of the popular sense that coffee opposes somnolence. Wainer and Thissen (1981) teach about this type of problem, writing that Chernoff faces "have been criticized because the affect associated with a particular variable configuration may work against the message the data structure is trying to convey. For example, if each aspect of the face was being used to represent a subscore on some personality inventory, it would be indeed unfortunate if a depressive was represented by a happy smiling face" (page 222).

In an embodiment of the invention, a mapping between a food attribute and a facial attribute has a direction and a magnitude, and the mapping reflects putative anatomic/physiologic links between the food attribute and the facial attribute. Merely by way of example, the wider open the eyes, the higher the amount of caffeine in the food (based on the assumption—somewhat cartoonish—that caffeine increases alertness, and increased alertness is reflected in wider opening of the eyes).

Chernoff faces often have a distinctly caricatured appearance. In an embodiment of the invention, a more realistic face is used as the basis of glyph 185, perhaps even a photo-realistic face. A photo-realistic face would potentially increase the amount of information that could be presented in glyph 185. Merely by way of example, facial attributes in such a face could include, but are not restricted to, apparent age of the face, weathering of skin, complexion and/or pigmentation. Some of these features could be physiologically tied to food attributes. Merely by way of example, high consumption of carotene can give the skin an orange-ish hue, atherogenic diets can produce wrinkling associated with "atherosclerotic facies." Other examples are possible.

Mappings: Normalized Values

Inventor has discovered that normalized amount of nutrients (e.g. normalized by unit weight) can sometimes be more clearly represented in facial glyph 185 than "absolute" amount (e.g. weight normalized to serving size or packaged size).

The nutrient content of foods can vary widely. For example, a sprig of parsley may have very small masses of some nutrients in comparison to a 32-ounce steak.

A wide range of nutrient content can complicate the design of a single D2G-map 120 which aims for applicability to as many foods as possible. This potential complication is related to a limited number of display possibilities for some facial feature(s), e.g. on a small display screen the length of a nose in facial glyph 185 may be restricted to 10 pixels, maximum. By comparison, the absolute value for a food's energy content might range from 0 (e.g. water) to beyond 1500 calories (e.g. a fast food sandwich weighing on the order of a half-pound). In this example, the available display range spans one order of magnitude (in base 10), while the absolute energy range spans 3+ orders of magnitude.

A designer of D2G-map 120 has a choice between losing resolution on lower amounts of energy content (which most foods have) or introducing a non-linear mapping between energy content and nose length.

Merely by way of example to illustrate a potential utility of weight-normalized food attribute values, 21 CFR 101.9 (pages 25 and 34) teaches that fat has 9 kcal/gram, protein has 4 kcal/gram, and carbohydrate has 4 kcal/gram. Thus, it is reasonable to assume that a food's normalized caloric content is between 0 kcal/gram (e.g. water) and 9 kcal/gram (e.g. pure fat). In this example, the range of weight-normalized energy content (0 to 9) more closely matches the display range (0 to 10 pixels). It is apparent in this example that normalized values can lead to a simpler mapping that preserves resolution, as compared with absolute values. Thus, the graphical resolution of a linear mapping for the normalized values could only be matched by a non-linear mapping for the absolute values.

Using weight-normalized amounts of nutrients—as opposed to serving-normalized amounts as commonly found in Nutrition Facts Labels—can be potentially useful for a second reason. Serving sizes have been suggested as problematic with respect to nutritional labels, e.g. a publication from the Cleveland Clinic advises consumers: "Servings may be smaller than you think" (Anonymous. "Nutrition: know the facts." *Cleveland Clinic Journal of Medicine*. 2005; 72: 619 only.). For example, when a package of food includes a non-unity number of servings, e.g. a box of breakfast cereal, consumers may have trouble determining how many servings they have consumed or will consume.

It may be more reliable for consumers to heft a food mass than it is for them to calculate the number of servings in the food mass. Providing information on a weight-normalized basis may, therefore, be more informative.

For a third reason information presented as per-weight nutritional information may be more helpful than absolute weight information, by allowing comparisons between attributes of different foods, independent of serving size or packaging amount. Merely by way of example, a pat of butter having a serving size of one gram will have a calorie content of approximately 9 kcal, which is a low number (e.g. compared to a package of frozen spinach) that may mislead consumers to think butter may be consumed with near impunity. By contrast, reporting that the butter pat has the highest possible caloric content per weight of any food will hopefully signal to the consumer that very little butter should be consumed as part of a low-calorie diet.

In some cases, weight-normalized amounts may be improved by normalized to anhydrous weight, or to the weight lacking inert filler.

Mappings: Advice, Ideal Face

Many physicians give dietary advice to their patients, e.g. "Limit the salt in your diet," or "Limit the pizza in your diet." (Other persons do this, too.) Such advice statements are, in general, conceptually distinct from statements about nutritional content, e.g. "Pizza is high in salt."

Inventor has discovered that facial glyph 185 can not only represent the attributes of foods, but can also communicate advice to human 192. Human 192 can use this advice in making food decision 196.

The "baseline face" has already been mentioned. When the baseline face is harmonious, attractive, pleasing, etc., it may reasonably be called an "ideal face." In an embodiment of the invention, D2G-map 120 is adapted to produce a glyph 185 that includes a face whose appearance tends toward the ideal face as the attributes of food 100 tend toward advised values.

Of course, a physician can construct statements that conflate advice and nutritional content, e.g. "Limit the pizza in your diet because it is salty" or "Limit salty pizza in your diet," however, it is still true that advice and fact are distinct concepts.

Notions of an ideal face may vary idiosyncratically or across cultures.

Terms like "goal food" or "ideal food" or "advised food" or "baseline food" may be used to describe a food 100 having a set of attribute values corresponding to a set of goal or ideal or advised or baseline attribute values. Other terms could be used. Such a food may not actually exist in the real world, but it can exist in the abstract.

Mappings: Limit-Group

In writing about calories, saturated fat, sodium, and sugars, Brownell and Koplan (2011) teach that "the population should limit its intake of each of these components." Mozaffarian et al teach that "consumers should recognize and avoid products containing trans fats" (Mozaffarian D, Katan M B, Ascherio A, Stampfer M J, Willett W C. "Trans Fatty Acids and Cardiovascular Disease." *New England Journal of Medicine*. 2006; 354: 1601-1613.). These teachings may be construed as having an advice component.

(Note: The five nutrients named above will be referred to as the "limit-group" of nutrients.)

Inventor has discovered that D2G-map 120 can be adapted to produce harmonious facial features when a nutrient from the limit-group is absent from a food or tends toward a minimum. Inventor has also discovered that D2G-map 120 can be adapted to produce inharmonious facial features as the amount of a nutrient from the limit-group increases.

In an embodiment of the invention, the appearance of the eyes is indicative of sugar amount, the appearance of the nose is indicative of the salt/sodium amount, the appearance of the mouth is indicative of the fat amounts, and the width:height ratio of the face is indicative of the calorie amount.

Figure 9:
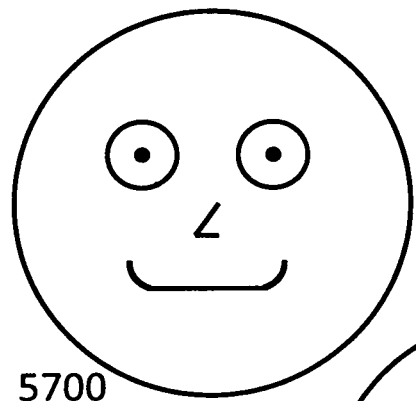
Figure 9:
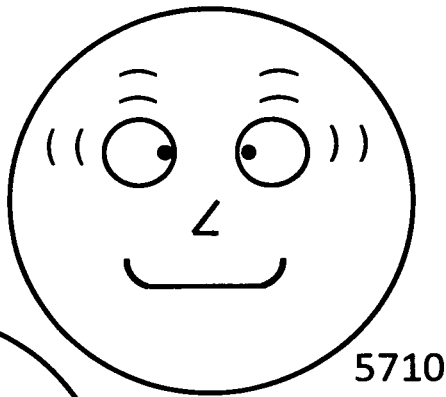
Figure 9:
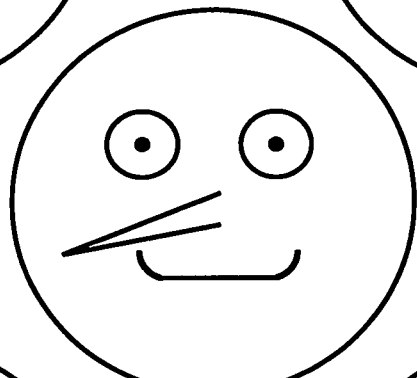
Figure 9:
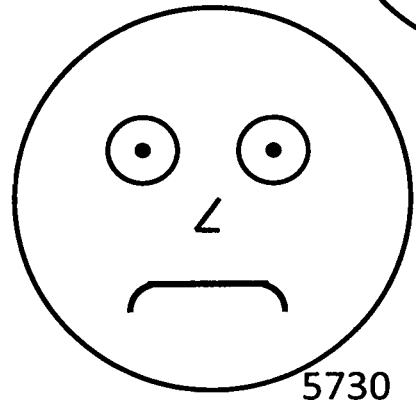
Figure 9:
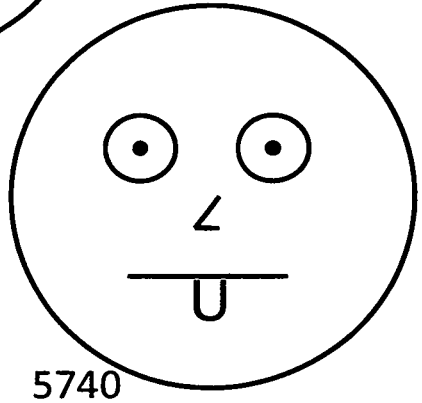
Figure 9:
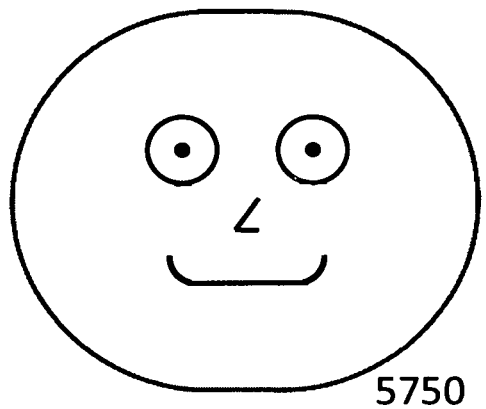
Figure 9:
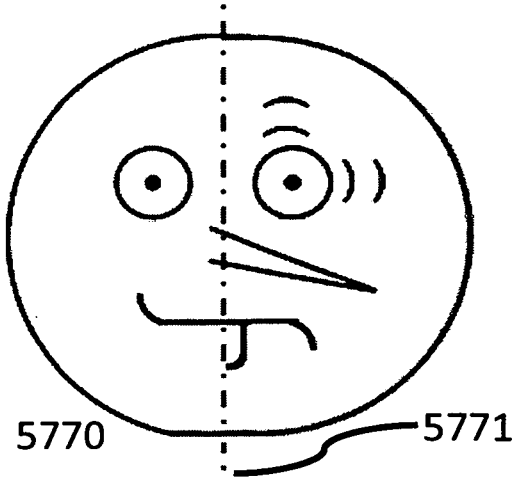

FIG. 9 shows an embodiment of the invention. Ideal face 5700 is associated with a food that is limited in calories, saturated fat, trans fat, sodium, and sugar. Ideal face 5700 is intended to have a harmonious appearance. Face 5710 is associated with a food that is high in sugar. (Calories are ignored in faces 5710, 5720, 5730, 5740.) Compared to ideal face 5700, the pupils of the eyes have a cross-eyed placement, and there are corrugation indications around the eyes. These are generally not harmonious features. Face 5720 is associated with a food that is high in salt/sodium; compared to ideal face 5700, the nose is large and has an unnatural shape. Face 5730 is associated with a food that is high in saturated fat; compared to ideal face 5700, the smile has been replaced by a frown. A frown is generally less pleasing than a smile. Face 5740 is associated with a food that is high in trans fat; compared to ideal face 5700, the tongue is protruding and the smile is gone. Face 5750 is associated with a food that is high in calories; compared to ideal face 5700, the width:height ratio of the face is higher, giving face 5750 an overweight appearance. Faces 5710, 5720, 5730, 5740, 5750 are intended to have a less harmonious appearance than face 5700. (Small differences between the hand-drawn faces in FIG. 9 are unintentional and should be ignored.) Other mappings between facial features and nutrient amounts are possible (e.g. total carbohydrate amount is mapped to the size and/or shape of the eyes).

In an embodiment of the invention, faces do not become inharmonious when a nutrient in the limit-group is absent from food 100. This contrasts with a teaching of Hunt, who omits a nose from his facial glyph for tuna because tuna has zero fat. Hunt describes the face's appearance as "somewhat alien."

Mappings: Hemi-Faces

Flury and Riedwyl have proposed that the left side and the right side of a Chernoff face can be used to represent different variables (Flury B, Riedwyl H. "Graphical representation of multivariate data by means of asymmetrical faces." *Journal of the American Statistical Association.* 1981; 76: 757-765.).

In an embodiment of the invention, one side of the face represents the nutritional composition of a first food, and the other side represents the nutritional composition of a second food. One of the foods may be an advised food. The magnitude of asymmetries between the two sides of the face are indicative of the magnitude of differences between the nutritional compositions of the two foods. If one of the foods were an advised food, then the magnitude of asymmetries between the two sides of the face would be indicative of the magnitude of deviations of the non-advised food's nutritional content as compared to the advised nutritional content. An element may be added to glyph 185 to indicate which food corresponds to which half-face.

Merely by way of example, face 5770 in FIG. 9 is asymmetric, with the face's right side (seen by the reader on the left side of the page) representing an advised nutritional content, and the face's left side (seen by the viewer on the right side of the page) representing the nutritional content of a food. The asymmetry is of marked degree, indicating a marked deviation from the advised nutritional content. A faint vertical line 5771 has been added to the face to highlight the asymmetry for purposes of clarifying the present exposition. In an embodiment of the invention, notches may be placed in the face outline superiorly and inferiorly, to highlight the border between the two half-face components.

Thus, unlike categorical information supplied by a "seal of approval" of an advised nutritional content (e.g. the American Heart Association's heart-and-checkmark) the described embodiment has a potential to show shades of difference.

Mappings: Construction

In an embodiment of the invention, a database is populated with parameters on which D2G-map 120 are based.

Facial perceptions may vary from person to person or, may be viewed as varying from culture to culture. In some cases, achieving the same facial perception in two different humans may require presenting each human with a different face. In a statistical sense, achieving the same facial perception in two different groups of humans may require presenting each group with a different face.

In an embodiment of the invention, a human supplies data about his or her perception of a face or faces. On the basis of these data, parameters are derived, parameters on which D2G-map 120 is based. Parameters may be tailored to produce mappings that result in instances of glyph 185 that give impressions in a person-or-persons which are comparable to the impressions given to another person-or-persons by other instances of glyph 185. Parameters may be stored in a database.

Merely by way of example, D2G-mappings 120 may be constructed which relate a food attribute profile to the same facial impression in two different persons. As an additional example, mappings 120 may be constructed which relate, statistically, a food attribute profile to the same facial impression in two groups of persons, each group of persons representing a different culture.

Schemes

As noted, D2G-maps 120 and D2A-maps 140 are possible.

In an embodiment of the invention, a single paired D2G-map 120 and D2A-map 140—called a "scheme"—is used. (The D2A-map may be nil, i.e. non-existent.) A scheme can be a type of personalization, and personalizations may be effected through scheme(s).

In another embodiment of the invention, a plurality of schemes are used. Electronic display devices offer the possibility of conveniently displaying a plurality of instances of glyph 185, each based on a different scheme.

Scheme Attributes

A scheme may have a plurality of attributes. Examples of scheme attributes include, but are not restricted to: an identity, a domain (i.e. the food attributes that are ultimately reflected in glyph 185), an author (i.e. the entity who devised the scheme), a sponsor, a target physiology, a viewpoint.

Examples of a scheme's designer and/or a scheme's sponsor include, but are not restricted to:
An individual—e.g. "Dr. Max Smartguy of Best-Ever University";
An organization—e.g.:
  A disease-oriented organization—e.g. American Heart Association;
  A professional organization—e.g. American Medical Association;
  A government organization—e.g. Food and Drug Administration;
  A corporation—e.g. Weight Watchers, Kellogg, McDonald's, Safeway;
  A religious organization;
  An advocacy organization—e.g. a pro-vegetarian organization
A group—e.g.:
  An interest group—e.g. a group of bodybuilders;
  Ad hoc groups.
Combinations of the above Examples of a scheme's target physiology include, but are not restricted to age groups (e.g. children, adolescents, senior citizens), pregnant women, ethnic or racial groups, sex or gender groups, athletes (e.g. a focus on strength, focus on endurance, focus on speed), disease states (e.g. management of diabetes mellitus, prevention of diabetes mellitus), functional states (e.g. longevity, superior memory), body composition states (e.g. obese, cachectic), non-human species (e.g. dog, cat—perhaps down to the breed level), appearance states (e.g. decrease abdominal circumference, improve hair texture), combinations of these. It is not required that such entities have distinct physiologies; it matters chiefly that such entities can be labeled.

A scheme's viewpoint pertains to D2G-map 120 and D2A-map 140 and the impressions that overall image 184 (including facial glyph 185) may give to human 192. For example, D2G-map 140 in scheme A may lead to increasingly inharmonious faces in glyphs 185 as the amount of nutrient X in foods is increased, whereas D2G-map 140 in scheme B may lead to increasingly harmonious faces in glyphs 185 as the amount of nutrient X in foods is increased. Scheme A and scheme B may be said to have different viewpoints regarding nutrient X. Merely by way of example, some physicians recommend liberal potassium intake to some people and recommend restricted potassium intake to others; if this situation were incorporated into two schemes, the two schemes would have a different viewpoint on potassium content, as with nutrient X above.

Indicating Scheme Attributes

In an embodiment of the invention, one or more scheme attribute values are indicated in connection with glyph 185 based on the scheme.

FIG. 7 shows an embodiment of the invention. An instance 410 of a first glyph 185 is displayed near nutritional label 398. Instance 410 is based on a first scheme. Merely by way of example, the display of instance 410 has no explicit indication of any attribute of the first scheme.

In FIG. 7 an instance 720 of a second glyph 185 is displayed. Instance 720 is based on a second scheme. The display of instance 720 is associated with the accessory display of alphanumeric string 722. String 722 indicates an attribute value of the second scheme.

Merely by way of example, alphanumeric string 722 may indicate the identity of the second scheme. In an embodiment of the invention a user may look up alphanumeric string 722 to obtain a more revealing description of the scheme and its attributes. In a second example, a bar code may indicate the value of a scheme attribute.

An instance 730 of a third glyph 185 is displayed in FIG. 7. Instance 730 is based on a third scheme. This display of instance 730 is associated with the display of an icon 734 and an alphanumeric string 732. Icon 734 shows a partial silhouette of a pregnant woman; it is intended to indicate a value of a target physiology attribute of the third scheme. Alphanumeric string 732, "ACOG", indicates a value of an author attribute of the third scheme. Merely by way of example, ACOG is an abbreviation for American College of Obstetrics and Gynecology. A user may, therefore, interpret instance 730 as indicating an American College of Obstetrics and Gynecology viewpoint about the food for pregnant women.

Knowing one or more attribute values of a scheme (e.g. author, sponsor, target physiology) can sometimes help a user decide how much stock to put in a glyph 185 (e.g. a man, for himself, may give little stock to a glyph associated with a pregnancy target physiology). In an embodiment of the invention scheme authors and scheme sponsors can use the display of scheme attribute values to build a brand for nutrition information.

Food companies can charge a fee to scheme authors and sponsors in return for displaying glyph 185 on packaging, advertisements, etc., the glyph being based on the author/sponsor scheme.

(In an embodiment of the invention, a "meta-scheme" attribute value indicates the company or other entity that is providing the infrastructure or resources to calculate and render glyph 185, e.g. the company marketing or selling the invention.)

Attribute values of a scheme can be displayed using alphanumeric strings, icons, bar codes, etc. FIG. 7 shows instances 410, 720, 730 of glyph 185 having zero, one, and two scheme attribute values displayed, respectively; it is possible to display three or more such values.

In an embodiment of the invention the overall style of glyph 185 is indicative of different schemes. Merely by way of example, when the target physiology is that of children, glyph 185 could be based on a kitten's face; or when the target physiology is that of men, glyph 185 could be based on an adult male face. As an additional example, when the target physiology is that of a Dalmatian dog, glyph 185 could be based on a Dalmatian dog's face. As yet another example, if the target physiology is that of a soldier, glyph 185 could be based on a squarish face. In still another example, a scheme sponsor may decide to base glyphs 185 on the face of a particular individual, e.g. Abraham Lincoln. Other examples are possible.

FIG. 7 shows three faces, each with a different appearance. For a single food, different schemes may produce faces that are the same or different.

Figure 8:
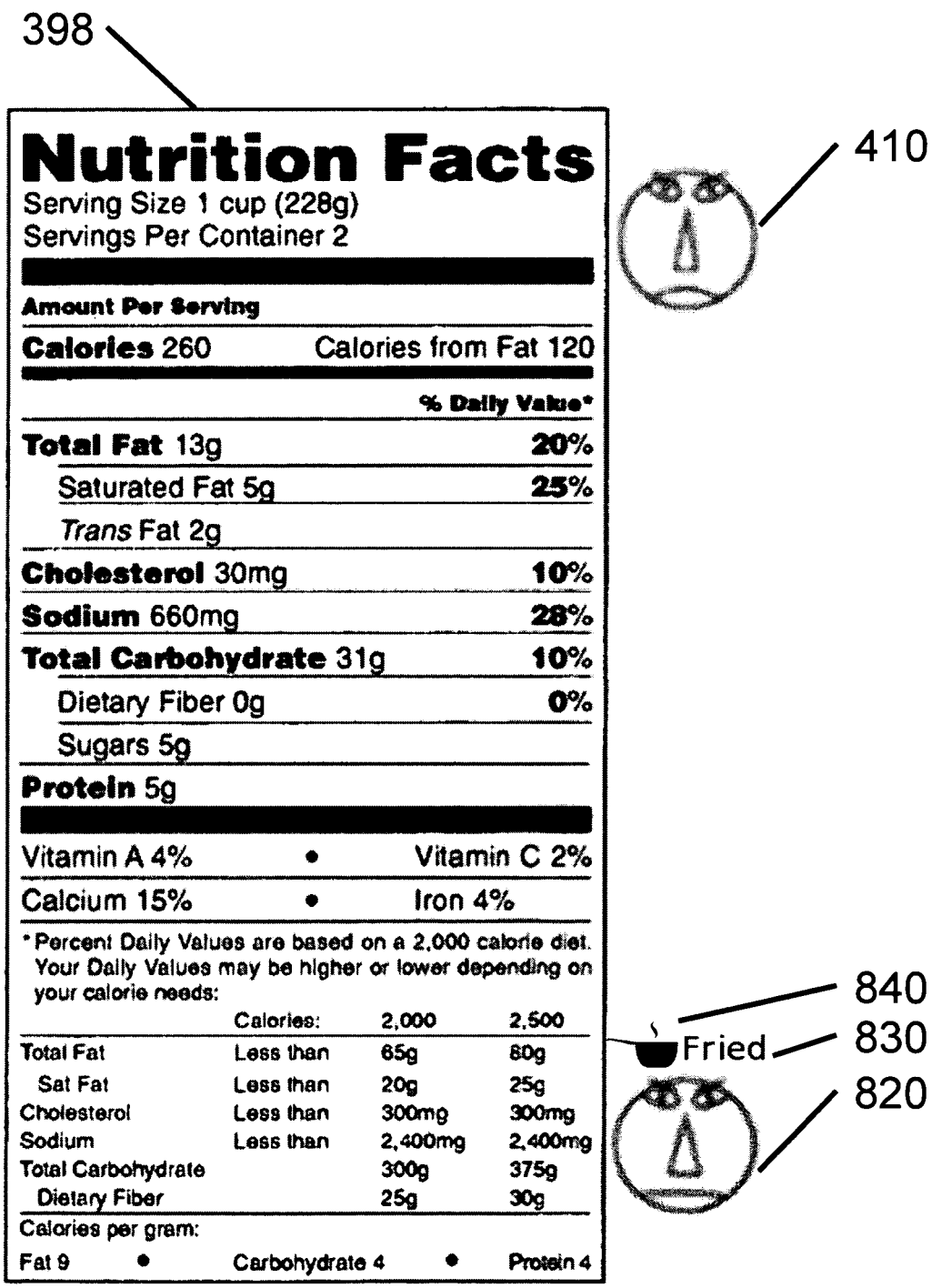

FIG. 8 shows an embodiment of the invention. Instance 410 of facial glyph 185 is in proximity to a Nutrition Facts Label 398. Three elements constitute the visual parts of a scheme representation: accessory icon 840 representing a frying method of food preparation, accessory text 830 referencing a frying method of preparation, and instance 820 of facial glyph. The intended interpretation of this figure would be that the difference between facial glyph 410 and facial glyph 820 reflects the effect of preparing the food by frying.

Electronic-Mechanical

In an embodiment of the invention, glyph 185 is displayed electronically or mechanically (as opposed, for example, to ink printing).

In an embodiment of the invention, attention may be drawn to a feature of glyph 185 by adding dynamism to the feature. Merely by way of example, if attention is to be directed to the eyes, the eyes could appear to twitch, or the color of the eyes could be varied over time, or the color of the background to the eyes could be varied over time. Other examples are possible.

In an embodiment of the invention, glyph 185 (and/or accessory elements 186) is coupled as a user interface component to a computing or mechanical device.

Figure 10A:
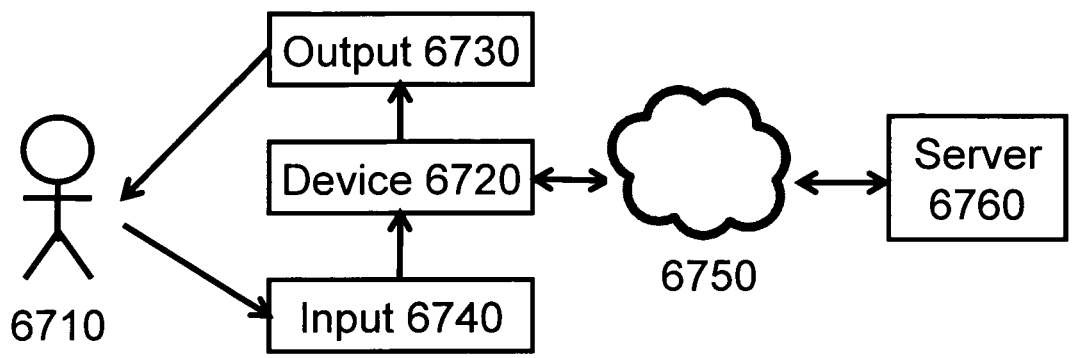

FIG. 10A shows human 6710 interacting with a digital device 6720 coupled to an output component 6730 and an input component 6740. In an embodiment of the invention, device 6720 is an electronic device, coupled to computer network 6750 that is coupled to server computer 6760. Server computer 6760 may be part of a cloud-computing system.

Input component 6740 may respond to one or more user actions, possibly in different ways. Examples of user actions include, but are not restricted to, a touch gesture, an utterance, a double-click with a computer mouse, a keyboard keypress, a head gesture.

Figure 10B:
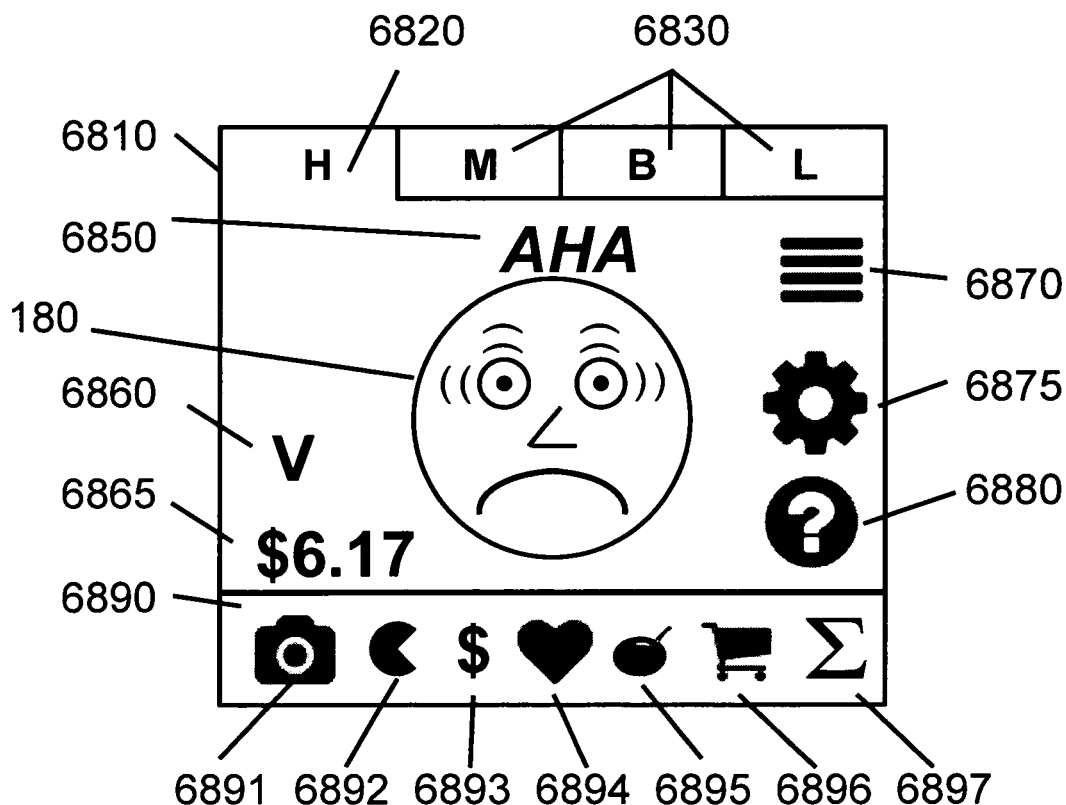

FIG. 10B shows an embodiment of the invention. (Item numbers carry forward from other figures.) Touchscreen 6810 functions as both output 6730 and input 6740. (Other implementations are known to persons of ordinary skill in the art.) Touchscreen 6810 displays glyph 185 and its accessory elements 186 to human 6710; merely by way of example, accessory elements 6850, 6860, 6865, 6870, 6875, 6880 appear in FIG. 10B. Glyph 185 reflects information about food 100, as may its accessory elements.

Accessory elements appear on the display in proximity to glyph 185. They are generally visual, but other modalities are possible, e.g. audio, haptic.

In an embodiment of the invention, glyph 185 in FIG. 10B is based on a personalization for a particular human. The identity of the particular human is referenced by first initial 6820 that appears in a tab. Tabbed displays are known to persons of ordinary skill in the art. Other humans of interest, e.g. other family members, are referenced by first initials 6830, each of which appears in a separate tab on touchscreen 6810. Merely by way of example, a family may include persons named Homer, Marge, Bart, and Lisa—the source of first initials 6820, 6830 in FIG. 10B.

When human 6710 taps on one of the other first initials 6830, a portion of the display of touchscreen 6810 is updated: glyph 185 and, possibly, accessory elements, are updated to reflect the personalization(s), and the tabs are updated to show which human's personalization(s) are reflected in glyph 185 and possibly an accessory element.

Accessory elements 6850, 6860, 6865, 6870, 6875, 6880 in FIG. 10B are examples. Different types of elements may be displayed in other embodiments of the invention and/or be part of a human's personalization(s).

Element 6850 indicates the author of the scheme underlying glyph 185. In this case, AHA identifies the American Heart Association. In an embodiment of the invention, element 6850 is an input icon; when triggered, it changes the display to show information about the author of the scheme (e.g. name, street address, phone number, email address, user ratings of reliability, home page, Twitter hashtag, Facebook page, etc.). Other triggered functionality includes, but is not restricted to, placing a phone call, sending an email or text message, entering a rating score.

(Language note: In paragraph above, and some below, triggering an icon is said to change the display. This is shorthand for saying that triggering the icon causes an action that results in the display changing. A similar shorthand is sometimes used for actions other than changing the display.)

Element 6860 indicates food 100 as meeting a definition of vegetarian. In an embodiment of the invention, element 6860 is an input icon; when triggered, it changes the display to show information about the definition of vegetarian. Other triggered functionality includes, but is not restricted to, logging a disagreement about whether food 100 meets the definition of vegetarian.

Element 6865 indicates the price of the food package, e.g. if user is shopping in a grocery store. In an embodiment of the invention, element 6865 is an input icon; when triggered, it changes the display to show information about the price of the food package. Merely by way of example, it may show a price history over recent weeks. As a second example, it may allow user to correct or confirm the price that is showing. As a third example, it may provide similar functionality to triggering currency-sign icon 6893.

Element 6870 is an input icon; when triggered, it changes the display to show the Nutrition Facts Label for food 100. In an alternative embodiment, a nutritional label may be displayed at full size in proximity to glyph 185 on output component 6730.

Element 6875 is an input icon (intended to appear like a gear); when triggered it changes the display to show a screen in which a user may add or otherwise alter personalization(s).

Element 6880 is an input icon; when triggered, it changes the display to show helpful information. Merely by way of example, it may show a key/legend that helps explain glyph 185. As a second example, it may show information on using interface elements of the input component 6740 and the output component 6730.

Action bar 6890 contains a plurality of input icons. The icons shown in FIG. 10B are examples. Other examples are possible.

Camera icon 6891, when triggered, activates a camera on device 6720 that can be used to photograph a food, food packaging, or a representation of these. Merely by way of example, user may photograph the bar code on a food package or a principal display panel or another panel of a food package to produce food specification 30. Device 6720 can then update touchscreen 6810 to reflect attributes of the newly specified food. In an embodiment of the invention digital device 6720 queries server 6760 to obtain attributes of the new food.

Open-mouthed-head icon 6892, when triggered, activates a microphone on device 6720. Merely by way of example, user may speak the bar code on a food package or a name of a food to produce food specification 30. Device 6720 can then update touchscreen 6810 to reflect attributes of the newly specified food.

Currency-sign icon 6893, when triggered, provides cost-saving functionality related to food 100. Such functions include, but are not restricted to, finding a similar food in the same store at a lower price, finding a similar food in a different store at a lower price, finding an on-line coupon for food 100, photographing a coupon for food 100 that is printed on paper, or functions similar to triggering element 6865.

Valentine icon 6894, when triggered, provides nutrition-improving functionality related to food 100. Such functions include, but are not restricted to, finding a similar food (or the same food, differently prepared) having more desirable nutritional content. "More desirable" may be based on the scheme on which glyph 185 is based.

Frying-pan icon 6895, when triggered, provides preparation information related to food 100. Merely by way of example, if food 100 is a piece of boneless, skinless chicken breast, triggering icon 6894 could present information about the nutritional content of the chicken piece when fried, broiled, grilled, etc. As a second example, if food 100 is a breakfast cereal, triggering icon 6894 could present information about the nutritional content of adding skim milk, whole milk, or strawberries to the cereal. Information on the various alternatives could be presented simultaneously or non-simultaneously.

Cart icon 6896, when triggered, provides functionality related to purchasing food 100. Merely by way of example, it may add food 100 to a list of foods (the "cart list") that will be charged to a credit card when user exits the grocery store. Quantity of a food may be enterable, too. As an additional example, cart icon 6896 may provide a gateway to managing a cart list previously constructed by triggering cart icon 6896, e.g. deleting items from the cart list. As yet another example, a diner in a restaurant may put the appetizer, main course, beverage, and dessert into the cart list. Other examples are possible, including the specification of additional lists ("para-lists") of foods.

In an embodiment of the invention, output component 6730 emits an alert when an undesirable food 100 is added to the cart list, where "undesirable" is based on food attribute value(s). Merely by way of example, output component 6730 may emit an audible beep, or display a red "X."

Sigma icon 6897, when triggered, provides overall information about the foods in the cart list or para-lists. Merely by way of example, glyph 185 may be updated to show the average composition of all foods on the cart list, with each food weighted according to the quantity assigned to the cart list. Continuing the example, a user would be able to change the tabbed display to show glyph 185 for other members of the family, to see if their personalized glyph 185 indicated undesirable nutritional quantities. As a second example, glyph 185 may be updated to show the most undesirable nutritional quantity for each of the features in glyph 185 (e.g. a shopper may have 10 pounds of broccoli and one jelly bean in her cart list, but glyph 185 will reflect the high-sugar content of the jelly bean, ignoring the low-sugar content of the broccoli). In an embodiment of the invention, tapping on glyph 185 after such an update of the display identifies the foods in the cart-list having undesirable nutritional content. As another example, a diner in a restaurant can sum all the courses of his or her meal.

In an embodiment of the invention, one or more elements of glyph 185 are responsive to a user action. Merely by way of example, when a user taps on a facial feature of glyph 185, information about the facial feature, in the context of glyph 185, is presented to the user. Such information could include, but is not restricted to:

A description of the facial feature's meaning (possibly similar to a key/legend)—e.g. "The curvature of the mouth reflects saturated fat content. A smile (upward curve) indicates no saturated fat is present in the food. A frown (downward curve) indicates saturated fat is present in the food. The more pronounced the frown, the more saturated fat is in the food."

An alphanumerical readout of the food attribute value being reflected in the facial feature—e.g. "Mouth curvature reflects a saturated fat content of 8 grams per serving".

In an embodiment of the invention, glyph 185 as a whole is responsive to a user action. Merely by way of example, when a user taps on glyph 185, information about food 100, personalization(s), or other matters, is presented to the user. Such information could include, but is not restricted to:

A description of food 100;

An alphanumeric summary of attributes of food 100;

An alphanumeric critique of attributes of food 100, e.g. in relation to what is advised or ideal.

FIG. 10B shows a touchscreen 6810 whose display is organized as a tabbed interface, with human identity references (e.g. first initials 6820, 6830) as the basis of the tabs. Tabs may be based on other entities. Merely by way of example, scheme authors, scheme sponsors, and scheme target physiology may be the basis of tabs. Other examples are possible.

An embodiment of the invention permits the comparison of two foods. Merely by way of example, the glyph 185 corresponding to each food may be placed side-by-side or in other spatial proximity to each other. As a second example, the glyph 185 corresponding to each food may be placed in temporal proximity to each other, e.g. output component 6740 alternates between displaying the two glyphs during a convenient period of time. As a third example, the glyph 185 corresponding to a first food may be morphed into the glyph corresponding to the second food, producing an animation. A "Chernoff movie," showing the change of one Chernoff face into another, may find utility in communicating the effects of preparing a food (e.g. frying it, salting it, etc.). Spoilage, decay, and other time-dependent characteristics of food could be communicated by such movies. Human 6710 may compare a large number of foods in a movie that rapidly alternates between the respective facial images 185 of the foods.

In an embodiment of the invention, two instances of glyph 185 based on different schemes are put in proximity to each other as a teaching tool. Merely by way of example, consider a male human newly diagnosed with diabetes mellitus deciding whether to eat a doughnut. He views a first glyph 185 for the doughnut, the glyph based on a scheme applicable to the general population. He then views a second glyph 185 for the doughnut, the glyph based on a scheme applicable to diabetics. The difference between the two glyphs is indicative of the difference in viewpoint with which he should regard the doughnut now that he has diabetes. As a second example, the first glyph 185 is put on one page of a book, and the second glyph 185 is put on the following page as part of a programmed learning course of instruction.

In an embodiment of the invention, two instances of glyph 185 are displayed in rapid alternating sequence. The rate may be on the order of several times a second, but need not be: it can be longer, e.g. on the order of second or minutes. In an embodiment of the invention, the display timing of the glyphs is controlled by human 192.

One or more attribute values of a food may be absent from a database. In an embodiment of the invention, a user 6710 is given an opportunity to enter data to fill the void resulting from the absent data. Output component 6730 may display a cue to be indicative of absent data, e.g. a question mark that replaces glyph 185, or replaces a facial feature of glyph 185, or replaces an accessory element of glyph 185; other examples are possible. User may enter data via input component 6740. Device 6720 stores data and/or transmits data to server computer 6760, making it available for future uses, possibly by other users. Multiple entries of the same attribute value by multiple users afford an opportunity to cross-check entries and rate the reliability of individual users with respect to data-entry. Device 6720 may store the attribute values in computer readable or human-readable media.

In an embodiment of the invention, human 6710 may obtain quantitative nutritional information about food 100 from glyph 185. Input component 6740 includes a camera. Human 6710 uses the camera to capture a digital image of a rendered version of glyph 185, e.g. one that is printed on a restaurant menu. Glyph 185 indicates attribute values of food 100. Device 6720 determines the attribute values of facial features of glyph 185 from the digital image. Merely by way of example, device 6720 may perform image processing to identify the eyes and determine that the eccentricity of the eyes is 0.2. Device 6820 may then translate the attribute values of glyph 185 into attribute values of food 100. Continuing the example, an eye eccentricity of 0.2 may translate to a sugar content of 10% by weight.

Such a translation may be conceptualized as a reverse D2G-map 120 (and possibly a reverse D2A map 140). Device 6720 may employ network 6750 and/or server computer 6760 in its tasks. If a personalization has been used in the production of glyph 185, then it would be advantageous to capture information about the personalization so that the corresponding reverse mapping(s) could be applied. To improve data fidelity, registration marks (fiducials, acting as calibration marks) may need to be added as an accessory feature of glyph 185.

In an embodiment of the invention, a food seller prints, on its cash register receipt or invoice, a glyph 185 for each food 100. A food buyer may then use an embodiment of the invention to acquire a copy of each glyph 185, reverse-map the attribute values of the glyphs, and write the attributes and attribute-values of each food into computer readable media. In this way, a human can conveniently keep track of all nutrients purchased. If the human consumes all the food purchased and logged in this way, and consumes only food logged this way, then the human will have a record of his or her nutritional intake.

In an embodiment of the invention, a facial glyph becomes part of a search function. A human 6710 can describe in an input means 6740 the attributes of a desired food as graphical entities, e.g. by eyes of a certain diameter, nose of a certain size, etc. These graphical entities are reverse-mapped into food attributes and values, which are sent to a food-search means that identifies foods matching the food attributes and values. A plurality of food-matching criteria are possible. Information about matching foods is returned to output means 6730. In an embodiment of the invention, human can specify the graphical entities de novo, or can alter facial features displayed as part of an instance of glyph 185 on output means 6730.

Merely by way of example, if glyph 185 for food 100 is displayed on a touchscreen and shows wide-open eyes (indicating, e.g., a high sugar content) human 6710 can specify a search for similar, but less sugary, foods by applying a pinch gesture to the eyes of glyph 185 as displayed on the touchscreen. The pinch gesture causes the display of glyph 185 to be updated: the eyes become less open. Glyph 185 now represents a desired food similar to food 100, except for having less sugar. Submitting the search triggers the reverse mapping and ultimately returns information about matching foods, possibly including a glyph 185 based on each of the matching foods.

In an embodiment of the invention, user conducts a search using a glyph 185 and optionally a food category, e.g. an alphanumeric reference to "tuna" or "breakfast cereal." The identities of the foods within the category whose attributes best match the attributes reflected in glyph 185 are transmitted to the user. If no food category is specified, all foods may be considered.

In an embodiment of the invention, server computer 6760 receives food identifier 260 (as in FIG. 2) and transmits to device 6720 an advertisement related to food 100 for display on output component 6740. A variety of criteria may be used to determine the advertisement(s) related to food 100, e.g. nutritional content, price, taste similarity, and so on. Advertisement may be displayed in temporal or spatial proximity to glyph 185 that is based on attributes of food 100.

In another embodiment of the invention, server computer 6760 receives or obtains information instead of, or in addition to, food identifier 260; selection of advertisement(s) is based on this information. Examples include, but are not restricted to, location of device 6720 (e.g. by using the location function built into an iPhone), user preferences (e.g. for Kosher food), location of similar foods.

Merely by way of example, consider a case where human 6710 uses an iPhone camera as input means 6740 to photograph a food package. Human 6710's latitude and longitude (as determined by location sensing means available with the iPhone) are sent to server computer 6760 along with information about the food package (e.g. the product's barcode). Server computer 6760 uses the latitude and longitude information to determine that human 6710 just made the photograph in a particular grocery store, "grocery X." Server computer 6760 then uses information from the food package, along with information about the layout of products in grocery X to determine the aisle in grocery X where user found and photographed the food package. In delivering an advertisement to human 6710 about a product Y, server computer 6760 looks up the location of product Y in grocery X. Server computer 6760 then adds text to the advertisement based on the information data, saying, e.g. "walk to the front of the store, turn left and go to aisle 4, walk half-way down aisle 4, and you will find product Y on the right side, bottom shelf." Server computer 6760 could also deliver a map of grocery X or an image of product Y's package, to output component 6730, to further assist and encourage human 6710.

Alternatively, user's location within a grocery store may be determined if the user photographs a product on a shelf near him, sends the photograph and latitude and longitude to server computer 6760. Server computer could deduce the grocery store from latitude and longitude, then consult the product-location database for that store, and, using the product barcode, retrieve the user's location within the store.

Server computer 6760 may choose a product Y to advertise based on the information it (server computer) receives or obtains. Merely by way of example, it may choose to advertise the sale product whose location is closest to the location of human 6710.

Many of the above paragraphs make reference to nutritional information. Often, non-nutritional food-attribute information may be treated in a manner similar to nutritional information. (Examples of food attributes are provided elsewhere in this document.) Merely by way of example, a mapping 335 and mapping 355 may be based on the cost of food 100.. As an additional example, users of the invention may give taste ratings to food 100, and these ratings may be communicated using a facial feature of glyph 185 or an accessory feature of glyph 185.

In an embodiment of the invention, the output of various steps may be transmitted over a network. Merely by way of example, food specifier 230, food identifier 260, food data 110, and/or rendering plans 160/170/169 may be transmitted over a network. Other items may be transmitted over a network.

In an embodiment of the invention, the output of various steps may be stored in computer readable media. Examples of computer readable media include, but are not restricted to, random access memory, flash storage, hard-disk storage.

It should be noted that the above sequence of steps is merely illustrative. For example, some steps can be performed using computer software or hardware or a combination of hardware and software. Ay of the above steps can also be separated or combined, depending on the embodiment. In some cases the steps can also be changed in order without limiting the scope of the invention claimed herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the sprit and purview of this application and scope of the appended claims.

In the foregoing specification, the invention has been described with reference to specific embodiments thereof. It will, however, be evident to one of ordinary skill in the art that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

TABLE 1

Food Attributes and Groupings of Food Attributes

These are examples Other attributes and groupings are possible.
Chemical
    a. Energy content
    b. Compositional
        i. Nutrient quantity
            1. Core nutrients
                a. Total Fat
                b. Saturated Fat
                c. Trans Fat
                d. Cholesterol
                e. Protein
                f. Total Carbohydrate
                g. Sugars
                h. Salt (Sodium)
                i. Dietary Fiber
            2. Other nutrients
        a. Vitamins
        b. Minerals (other than salt)
        c. Other
            ii. Ingredient qty
            iii. Sub-food qty
    c. Preservatives
    d. Adulterants
    e. Filler quantity
    f. Water content
    g. Density
    h. Chemical attributes can be grouped in other ways, e.g. the US FDA has a set of chemical attributes that it requires be present on the Nutrition Facts Label
Physiological
    a. Allergy
    b. Pharmaceutical interference
    c. Glycemic index
    d. Spiciness
    e. "Healthiness"
        i. Per criterion #1
        ii. Per criterion #2
        iii. Etc.
Social
    a. Cost
        i. Retail price
        ii. Bulk price
        iii. Price history
        iv. Food-stamp eligible
        v. WIC (Women infants children) eligible
    b. Taste rating
        i. Sweet
        ii. Sour
        iii. Bitter
        iv. Salty
        v. Umami
        vi. Pleasantness
        vii. Fruitiness
        viii. "Interestingness"
    c. Identity
    d. Name
    e. Approvals
        i. Penna. Dept. Agriculture
        ii. FDA
    f. Classification
        i. Kosher
        ii. Halal
        iii. Vegetarian
        iv. Vegan TABLE 1-continued Food Attributes and Groupings of Food Attributes Handling
    a. Storage method
        i. Refrigeration
        ii. Freezing
        iii. Ambient
    b. Shelf life
        i. Use-by date
    c. Preparation method
        i. Raw
        ii. Cook
            1. Broil
            2. Boil
            3. Grill
            4. Fry
        iii. Smoke
        iv. Dry/Dessicate/Dehydrate
Other
    a. Organic
    b. Fresh

TABLE 2

Exemplary Mnemonic Physiological Connections between Food Attributes and Facial Attributes

| Food Attribute | Facial Attribute | Mnemonic Physiological Connection |
|---|---|---|
| Protein | Hair on the scalp and/or face; length and/or portion of scalp covered | Hair is generally composed largely of protein. Thus, more hair could indicate more protein in the food. |
| Protein subtypes | Mustache, ear hair | Mustache hair has different properties than scalp hair (e.g. balding rarely affects mustaches); ear hair is often considered undesirable. |
| Calories/ energy | Width of head/face; cheek protrusion; double-chin | Ingesting excess calories can produce a widening of the head/face due to accumulation of fat, i.e. an appearance of fatness/obesity. A double-chin is often an indication of obesity. |
| Salt/ sodium | Tears | Tears often taste salty. Thus, more or bigger tears could indicate more salt in the food. |
| Salt/ sodium | Tongue [protrusion] | (i) Excessive salt can in some cases unconsciously cause a person to project their tongue outwards, (ii) Salt generally has a readily identifiable taste on the tongue. Thus, a greater protrusion of the tongue could indicate a greater salt content in the food. |
| Salt/ sodium | Nose [size] | Nasal mucus often tastes salty. A function of the nose is to humidify dry air. Salt crystals are generally dry (else they would dissolve). Also: it has been reported that the noses of indigenous desert peoples tend to be larger than non-desert peoples. |
| Sugar | Eyes and/or eyebrows and/or forehead | Sugar has a reputation in some circles for causing a "hyperactive" or "wired"state, a state which may be recognized in some cases or caricatured by widely open eyes and/or elevated eyebrows and/or a horizontally furrowed forehead. Thus, the greater this overall visual effect, the greater the sugar content. |
| Sugar | Teeth | Sugar is well known to promote tooth decay. Thus, the more missing, discolored, or disfigured teeth, the more the sugar content. |

TABLE 2-continued

Exemplary Mnemonic Physiological Connections between Food Attributes and Facial Attributes

| Food Attribute | Facial Attribute | Mnemonic Physiological Connection |
|---|---|---|
| Fat | See "Calories/ energy" | Of the three major nutritional components (fat, protein, carbohydrates), fat is the highest in calories per gram. Relatively speaking, therefore, a high fat diet makes a person fatter, which can include widening of the head/face. |
| Fat | Pimples | Greasy skin is often linked to pimply skin in teenagers. Grease is similar to fat. |
| Spiciness | Tears | Spicy food can make some people shed tears. |
| Spiciness | Sweat | Spicy food can make some people sweat. Note: In this table, "content" could also mean "concentration." |

TABLE 3

Exemplary Accessory Elements 186 an "X" overlaid over the facial glyph 185 -- e.g. indicative of a major warning about food 100;
a red background for the facial glyph 185 -- e.g. indicative of a major warning about food 100;
a number underneath the face -- e.g. indicative of the number of servings of food 100 in a package, or indicative of the amount of a nutrient in food 100;
text underneath the face;
another glyph or icon -- Examples include, but are not restricted to:
  the letter "P" with a circle around it and a bar through it, indicative that consumption may bring harm to people with phenylketonuria;
  a drawing of a peanut with a large "X" over it, indicative that people with allergy to peanuts may experience problems if they consume the food 100;
  an exclamation mark indicative of an alert or something about food 100 being out of the ordinary;
  a vertical rectangle to the side of the facial glyph 185, the lower part of the rectangle being solid, and the upper part only outline, the height of the solid/outline border being indicative of consumer satisfaction with food 100 (e.g. the higher the border the higher the consumer satisfaction);
  zero or more star icons (possibly including fractional-star icons), indicative of a rating of food 100 or a subset of characteristics of food 100.
  a horizontal line underneath the facial glyph 185, to serve as a normalizer for a dimension of the face.
  calibration marks in the vicinity of facial glyph 185, to assist in interpreting elements of facial glyph 185.
  a rectangle or square around the facial glyph 185, of a dimension adequate to enclose n copies of the facial glyph 185, where n is the number of servings of food 100 in a package of food 100.
  a light-colored "V" shape overlaid on the face, indicative that the food is
  compatible with vegetarian standards;
  an outline or image of an animal with an overlying circle-and-bar (as in international road signs), indicative that food 100 is compatible with vegetarian standards;
  a Star of David under the face (e.g. in the position where a bowtie would be visible), indicative that food 100 meets kosher standards;
  a crescent under the face, indicative that food 100 meets halal standards.
  a valentine-and-checkmark glyph, as used by the American Heart Association (AHA), indicative that food 100 received that mark from the AHA. Other organizational marks may be similarly presented.
  an icon representing a frying pan, indicative that food 100 has been prepared by frying.
  other icons pertaining to food preparation, e.g. flame-broiling, microwaving, no-preparation (e.g. raw), roasting.
  icon(s) relating to whether food 100 is organic, fresh, local-grown, eco-friendly, etc.

TABLE 3-continued

Exemplary Accessory Elements 186 the American Cancer Society icon, indicative that food 100 has been approved by the American Cancer Society. Other organizational icons may be similarly presented.
  a national mark (e.g. a flag, a symbol (such as a national animal), etc.), indicative that food 100 has been registered with the corresponding national body, approved by the national body, etc. A state mark may be used for the same indication by a state agency (e.g. Pennsylvania Department of Agriculture).

Appendix—Terminology

Nutrient—A physical or chemical component of a food, e.g. protein, fat, calories, ash, salt (sodium), water, selenium, vitamin B12. We often want to communicate to a human the amount of the nutrient in a food. Nutrient amounts, however, are but a type of food attribute. Other food attributes may often be communicated in the same way as nutrient amounts.

Food—A substance ingested by an organism. In many cases the preparation of a food can change its nutritional content, e.g. by combining two foods (salting a potato, for example), by chemically transforming it (cooking it, for example). (Some might argue that it changes to a different food—this is an implementation consideration.) Amount (of a nutrient)—May be reported as an "absolute" amount (e.g. 4 grams per serving, 0.5 cups per package), a normalized amount (e.g. mg/g, percent by weight, percent by volume, percent of recommended daily intake for a pregnant woman), etc.

Setting—A site in space-time where communication of food attributes to a human occurs. In an embodiment of the invention, the site of glyph 185. Examples include, but are not restricted to: a food's packaging, a restaurant menu, an electronic display, a peel-and-stick label, a book, a magazine.

Electronic display examples include cellphone screen (includes smartphones), iPod screen, Motorola MC-17 screen, supermarket checkout display, television screen, computer monitor, spectacles-cum-computer.

Personalization—Allows a person to tailor aspects of the invention, whether for self or on behalf of another organism that eats ("the eater"). Can personalize, for example:
  Food-nutrient database—e.g. with recipes. A restaurant owner may want to do this.
  D2G-maps—e.g. red eyes to avoid the food, half-and-half display with ideal food, mnemonic correspondences between food attributes and facial attributes based on anatomic/physiologic links, dysmorphism
  D2A-maps—e.g. red background to avoid the food
  Output setting
  Other personalizations are possible.
  Basis for personalization—Examples include, but are not restricted to, own preferences; subjects genetic codes or family history; subject's medical history (e.g. HTN, DM, coronary disease, CRF, weight); subject's goals (related to disease; weight).
  Ingredient—Per 21 CFR 101.4 ingredients can be subjected to different regulatory rules than nutrients such as fats, protein, etc.

Facial attributes—(Also known as facial features.) Facial features may be defined as visual characteristics of a face, whether in real life or in caricature. Facial features include, but are not restricted to:
  elements of the face identifiable by simple nouns (e.g. nose, eyes (and eye sockets, eye lids, pupil, iris, sclera, etc.), ears, mouth, lips, chin, chin dimple, hair (scalp, nose, beard, ear, sideburns, mustache, eyebrows), philtrum, glabella, cheeks, forehead, temples);

more complex elements (e.g. outline/contour of the face);

elements that are only sometimes visible (e.g. tongue and teeth are not generally visible if the mouth is closed);

elements that are uncommon or pathological (e.g. scars, wounds, warts, moles, cleft lip, missing teeth, discolored teeth, chipped teeth, prominent bulging of the masseter muscles);

elements produced by parts of the face or head (e.g. tears may be produced from the tear ducts and appear on the face, saliva may be produced by the salivary glands and appear on the face, sweat may be produced by skin on the face or head, a shadow may be produced by the head or the nose);

adornments (e.g. earrings, hat, tattoos, piercings, ear muffs, eye glasses, head scarf, hair ribbon). Adornments may include items worn in proximity to the face, e.g. bow-ties.

Feature attributes is short for "objective attributes of facial features." A facial feature potentially has a number of objective attributes governing its appearance. Examples include, but are not restricted to:

size, shape, color, shading, texture;

presence/absence (e.g. a tooth or a chin dimple or tears or a scar may be present or absent);

integrity (e.g. a chipped tooth is missing part of itself);

arrangement (e.g. how scalp hair is styled or parted, opening of mouth, protrusion of tongue, curling of tongue);

position (e.g. position of the eyebrows, where on the face tears appear);

symmetry.

In some cases, a glyph that is identified as representing a face may have one or more features whose attribute values do not correspond to reality, e.g. the eyebrows may be placed above the upper margin of the head (see, for example, FIG. 1 in Flury and Riedwyl), the nose may have a thickness that is thinner than a hair, and so on. Such glyphs are nevertheless identified as faces because they are faces in caricature.

Tufte has proposed using only a half-face as a Chernoff face, in order to save space (Visual Display of Quantitative Information. Page 97.).

Facial impressions—A glyph representing a face may impart one or more subjective impressions to a viewer. Examples include, but are not restricted to:

Attractiveness

Bizarreness

Emotional expression (e.g. anger, fear, sadness)

Physiological state (e.g. sleepy, asleep, hyper-stimulated)

In general, facial impressions derive from the facial features and the values of their objective attributes. For example, both general "averageness" of the various facial features and facial symmetry have been proposed as factors involved in facial attractiveness (Komori M, Kawamura S, Ishihara S. "Averageness of symmetry: which is more important for facial attractiveness?" *Acta Psychologica*. 2009; 131: 136-142.).

In some cases, it is possible to construct a mapping from one or more facial features to a facial impression. Such mappings may be of varying complexity and may vary from person to person, or from culture to culture.

Merely by way of example, person A may get the impression of obesity from any facial glyph that has a wide face, whereas person B may get the impression of obesity only when the face is wide and the lateral extent of the eyes and mouth is within the middle third of the glyph. As a second example, persons of culture C may generally get an impression of attractiveness from a facial glyph that has a wide nose, whereas persons of culture D may not.

Food—Food is herein used to mean any compound ingested or taken into the body. Thus, some definitions of "food" omit water, because it has no calories, but we include it, as it has attributes, such as mass, non-allergenicity, spiciness (which is zero), cost, etc.

Glyph—A variety of methods may produce a glyph, e.g. hand-drawing, painting, computer generation, and so on. A glyph may have a certain style, e.g. realistic, caricature, schematic, two-dimensional appearance, three-dimensional appearance. A glyph may be part of a series of glyphs displayed in sequence, e.g. a movie.

What is claimed is:

1. A system for communicating information about attributes of a food, the system comprising:
    a value of a first attribute of the food;
    a value of a second attribute of the food, the second attribute of the food being different from the first attribute of the food;
    a first processor that applies a first attribute map to the value of the first attribute of the food yielding a first facial attribute rendering plan, the first facial attribute rendering plan including information on rendering a visual representation of a first facial attribute;
    a second processor that applies a second attribute map to the value of the second attribute of the food yielding a second facial attribute rendering plan, the second facial attribute rendering plan including information on rendering a visual representation of a second facial attribute;
    an output device that renders a visual representation of a face using the first facial attribute rendering plan and the second facial attribute rendering plan, the visual representation of the face including the first facial attribute and the second facial attribute.

2. The system of claim 1 additionally comprising a package for the food, wherein the output device renders the visual representation of the face onto a surface of the package.

3. The system of claim 2 wherein the surface is a front surface of the package.

4. The system of claim 2 wherein the output device is a printer and the rendering is a printing.

5. The system of claim 1 additionally comprising a nutritional label for the food, the nutritional label appearing on a medium, wherein the output device renders onto the medium the visual representation of the face.

6. The system of claim 5, wherein the output device renders the visual representation of the face within a boundary of the nutritional label.

7. The system of claim 5 wherein the nutritional label includes quantitative data about a fat content of the food and quantitative data about a protein content of the food and quantitative data about a carbohydrate content of the food.

8. The system of claim 5 wherein the nutritional label has a width; and
    the nutritional label and the visual representation of the face have a distance separating them; and
    the distance separating the nutritional label and the visual representation of the face is less than one-half the width of the nutritional label.

9. The system of claim 5 wherein the nutritional label and the visual representation of the face have a distance separating them; and the distance separating the nutritional label and the visual representation of the face is less than two inches.

10. The system of claim 5 wherein the visual representation of the face has a width; and the distance separating the nutritional label and the visual representation of the face is less than the width of the visual representation of the face.

11. The system of claim 5 wherein the medium is an electronic display.

12. The system of claim 11 wherein the electronic display is a cellphone screen.

13. The system of claim 5 wherein the medium is a printed medium.

14. The system of claim 13 wherein the printed medium is a printed menu.

15. The system of claim 1 additionally comprising a value of a third attribute of the food, the third attribute of the food being different from the first and second attributes of the food;

a third processor that applies a third attribute map to the value of the third attribute of the food yielding a third facial attribute rendering plan, the third facial attribute rendering plan including information on rendering a visual representation of a third facial attribute;

wherein the visual representation of the face rendered by the output device is rendered using the first and second and third facial attribute rendering plans, and wherein the visual representation of the face additionally includes the third facial attribute.

16. The system of claim 1 additionally comprising a package for the food, the package having a first surface; and additionally comprising a physical medium attached to the package, the physical medium having a second surface, wherein the output device renders the visual representation of the face onto the second surface.

17. The system of claim 16 wherein the physical medium is attached by an adhesive to the first surface of the package.

18. The system of claim 17 wherein the physical medium is an adhesive label.

19. The system of claim 1 wherein the first processor and the second processor are the same.

20. The system of claim 19 additionally comprising a package for the food, wherein the output device renders the visual representation of the face onto a surface of the package.

21. The system of claim 19 additionally comprising a nutritional label for the food, the nutritional label appearing on a first medium, wherein the output device renders onto the first medium the visual representation of the face.

22. The system of claim 19 additionally comprising a package for the food, the package having a first surface; and additionally comprising a physical medium attached to the package, the physical medium having a second surface, wherein the output device renders the visual representation of the face onto the second surface.

* * * * *